United States Patent
Miller, II et al.

(10) Patent No.: US 10,150,196 B2
(45) Date of Patent: Dec. 11, 2018

(54) METHOD AND AUTOMATED ROVER DEVICE FOR SURFACE TREATMENT

(71) Applicant: The Boeing Company, Chicago, IL (US)

(72) Inventors: Richard Allen Miller, II, Seattle, WA (US); Steven Jay McAllister, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 15/233,263

(22) Filed: Aug. 10, 2016

(65) Prior Publication Data

US 2018/0043493 A1    Feb. 15, 2018

(51) Int. Cl.
| | |
|---|---|
| *B24B 55/05* | (2006.01) |
| *B24B 23/00* | (2006.01) |
| *B24B 5/00* | (2006.01) |
| *B29C 59/02* | (2006.01) |
| *B29C 59/00* | (2006.01) |
| *B24B 55/10* | (2006.01) |

(52) U.S. Cl.
CPC .............. *B24B 5/00* (2013.01); *B24B 55/102* (2013.01); *B29C 59/002* (2013.01); *B29C 59/02* (2013.01); *B29C 2059/027* (2013.01)

(58) Field of Classification Search
CPC ................................ B24B 23/00; B24B 55/05
USPC .................... 451/357, 439, 344, 5, 456, 429
See application file for complete search history.

(56) References Cited

U.S. PATENT DOCUMENTS

| | | | |
|---|---|---|---|
| 2,524,332 A | * | 10/1950 | Sichel ..................... B24B 7/14 |
| | | | 451/439 |
| 3,823,455 A | | 7/1974 | McIlrath et al. |
| 4,679,356 A | * | 7/1987 | Thomas .................. B24B 3/006 |
| | | | 451/439 |
| 4,934,108 A | * | 6/1990 | Hall ......................... B24B 3/38 |
| | | | 451/358 |
| 9,505,101 B1 | | 11/2016 | Register |
| 2005/0265798 A1 | | 12/2005 | Boyl-Davis et al. |
| 2014/0305217 A1 | | 10/2014 | Tapia et al. |

FOREIGN PATENT DOCUMENTS

| | | |
|---|---|---|
| CN | 107225480 A | 10/2017 |
| FR | 2661698 A1 | 11/1991 |
| GB | 2016321 A | 9/1979 |
| WO | WO8103455 A1 | 12/1981 |

OTHER PUBLICATIONS

Miller, II et al. "Method and Apparatus for Applying a Strip of Material Over an Edge on a Structure," U.S. Appl. No. 14/808,468, filed Jul. 24, 2015, 57 pages.

Intellectual Property Office of the United Kingdom Search and Examination Report, dated Jan. 25, 2018, regarding Application No. GB1712044.5, 9 pages.

\* cited by examiner

*Primary Examiner* — Robert Rose
(74) *Attorney, Agent, or Firm* — Yee & Associates, P.C.

(57) ABSTRACT

An automated rover device removes material from opposite surfaces of an elongate part, such as a composite stiffener. The device includes a pair of material removal tools along with a vacuum assembly for vacuuming away material removed by the tools.

20 Claims, 27 Drawing Sheets

METHOD AND AUTOMATED ROVER DEVICE FOR SURFACE TREATMENT

BACKGROUND INFORMATION

1. Field

The present disclosure generally relates to surface treatment methods and equipment, and deals more particularly with automated rover device for treating surfaces of a large part such as a composite laminate stiffener.

2. Background

Surfaces of relatively large parts sometimes need to be treated or prepared prior to a subsequent production operation. For example, certain surfaces of composite laminate stiffeners such as stringers need to be sanded prior to the application of materials for detecting barely visible impact damage (BVID). The sanding process is carried out manually by multiple technicians who hand sand the entire length of the stringer. The hand sanding is both labor-intensive and time-consuming, and must be carried out in a downdraft booth in order to carry away dust generated by the sanding process. Moreover, the use of hand labor to perform the sanding introduces the possibility of variations in the amount of material that is removed from different sections of a stringer, as well as variations from part-to-part.

SUMMARY

The disclosure relates in general to surface treatment methods and equipment, and more specifically to an automated rover device for treating surfaces of a part, such as a composite laminate stiffener.

According to one aspect, a device is provided for treating surfaces of elongate part. The device includes a frame and a drive carried on the frame for driving the device along the length of the part. The device also includes a pair of surface treatment tools carried on the frame for respectively treating the surfaces of the part. A vacuum assembly is supported on the frame for carrying away material generated by the surface treatment tools. A controller is provided for controlling operation of the drive, the surface treatment tools and the vacuum assemblies.

According to another aspect, an automated rover drive is provided for sanding opposite sides of an elongate composite stiffener. The rover device includes a frame assembly, a drive assembly mounted on the frame for driving the rover device along the length of the composite stiffener, and a pair of sanders mounted on the frame for respectively sanding the opposite sides of the stiffener.

According to a further aspect, a method is provided of sanding opposite sides of a composite stiffener. The method includes placing a rover device on the composite stiffener, and driving the rover device for movement along the length of the composite stiffener using a drive assembly on-board the rover device. The method also includes sanding the opposite sides of the composite stiffener using a pair of sanders on-board the rover device wherein the sanding produces material dust. The method also includes removing the material dust using a vacuum assembly on-board the rover device. The method also includes sensing an end of the composite stiffener using a sensor on-board the rover device and disengaging the drive assembly when the sensor has sensed that the rover device has reached the end of the composite stiffener.

One of the advantages of the method and rover device is that the amount of labor required to sand surfaces of a part such as a composite stiffener is substantially reduced.

Another advantage of the method and rover device is that the amount of material sanded from the composite stiffener can be precisely controlled, and part-to-part variations are reduced.

A further advantage of the method and rover device is that the amount of time required to sand a composite stiffener is substantially reduced, resulting in increased production rate.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
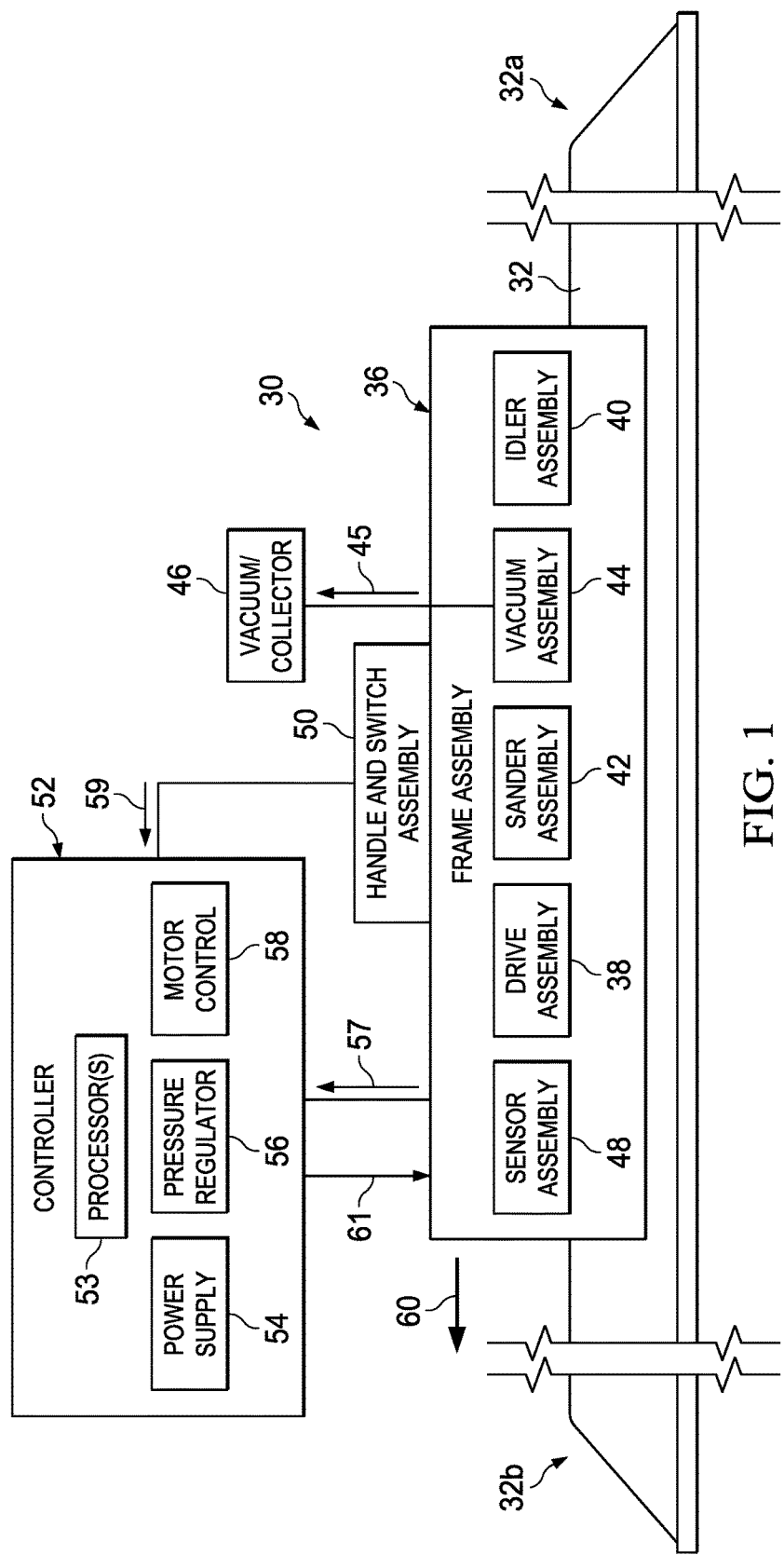
FIG. 1 is an illustration of a functional block diagram of an automated rover device for treating surfaces of a part.
Figure 2:
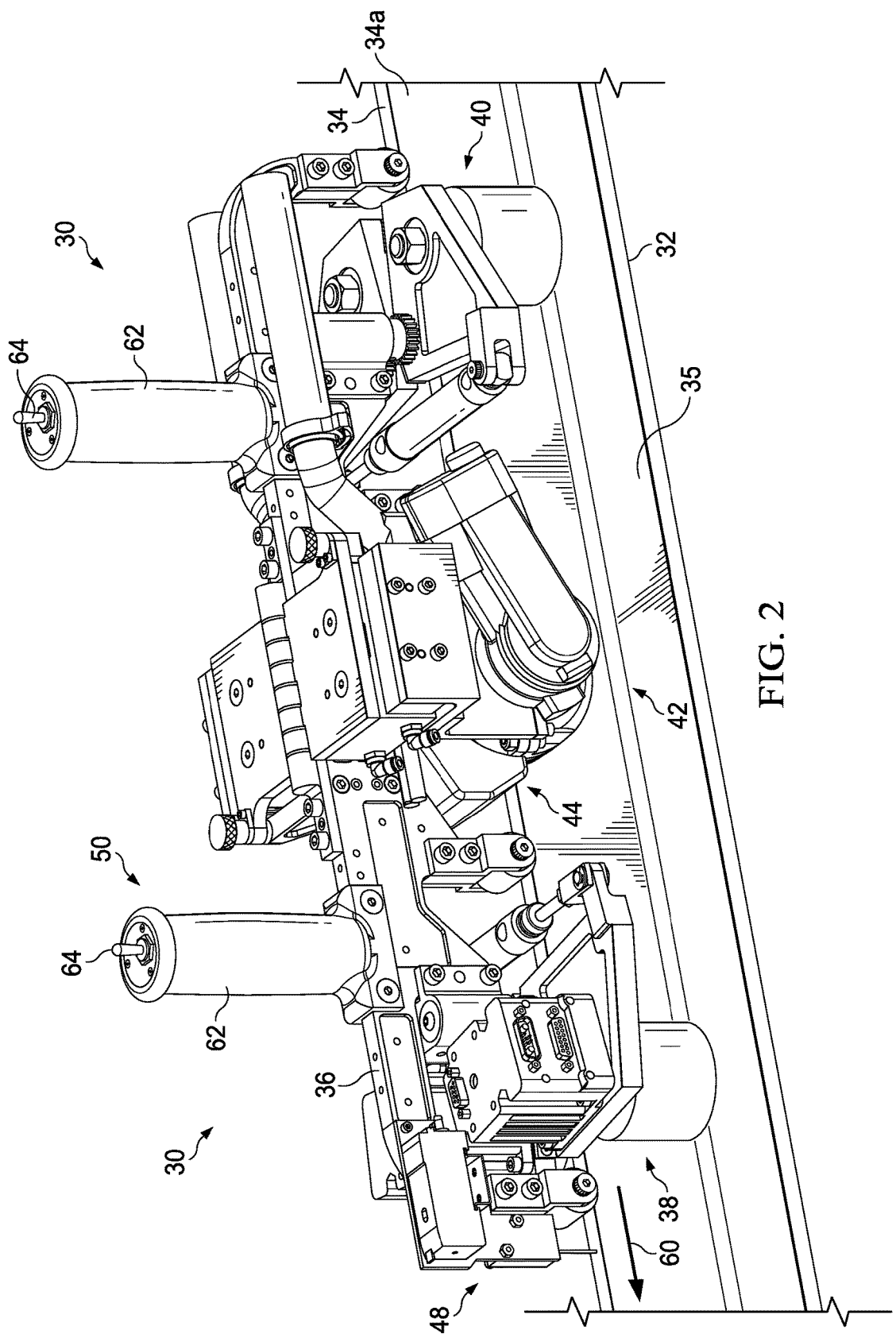
FIG. 2 is an illustration of a perspective view of one embodiment of the rover device of FIG. 1, showing sanding surfaces of a composite laminate blade stiffener.
Figure 3:
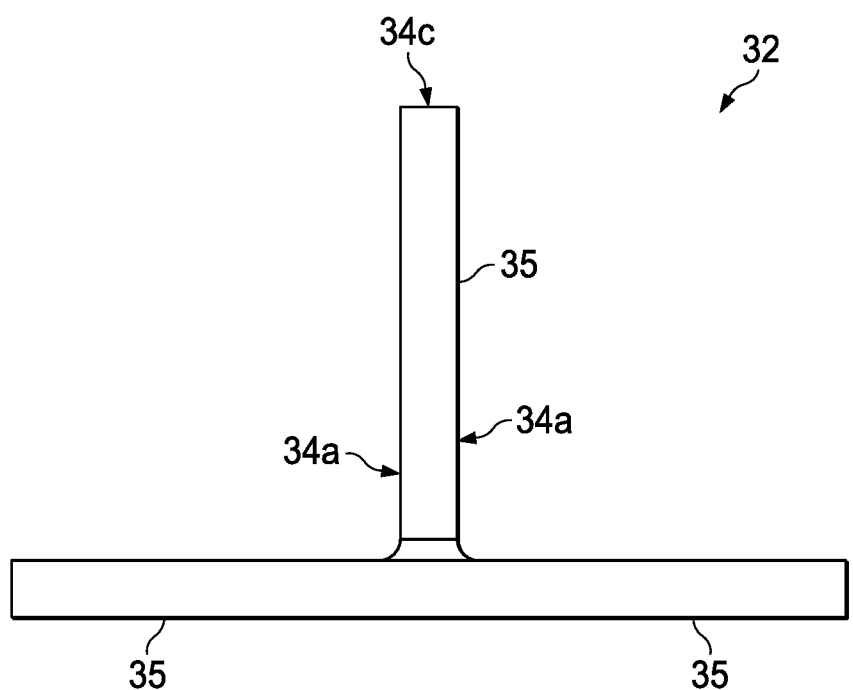
FIG. 3 is an illustration of the cross sectional view of the blade stiffener shown in FIG. 2.

Referring first to FIGS. 1, 2 and 3, an automated rover device 30 is adapted to treat opposite surfaces 34a of a part 32. In one application, the rover device 30 may be used to remove material 45 from a part 32 as by sanding surfaces of the part 32. In the illustrated example, the part 32 comprises a composite laminate stiffener 32 in the form of a blade stringer 32 having flanges 35 (see FIG. 3) and a blade 34. However the rover device 30 may be utilized to remove material from surfaces of a wide range of other types of parts having various geometries. As will be discussed below in more detail, the rover device 30 is placed on the part 32 (also sometimes referred to herein as a stiffener 32 or stringer 32) and moves 60 (FIG. 1) along the length of the part 32 from one end 32a of the part 32 to the opposite end 32b while performing treatment of the surfaces of the part 32. In the illustrated example, the rover device 30 removes a pre-calibrated amount of material from the surfaces 34a, however other types of surface treatments are possible. The fully automated rover device 30 is operated by a controller 52 which may include, without limitation, a power supply 54, one or more pressure regulators 56, a motor control 58 and one or more processors 53.

The rover device 30 broadly comprises a drive assembly 38, an idler assembly 40, a sander assembly 42, a vacuum assembly 44 and a sensor assembly 48. The rover device 30 also includes a handle and switch assembly 50 comprising a pair of spaced apart handgrips 62 and toggle switches 64. The handle and switch assembly 50 allows an operator to grip, lift and place the rover device 30 on the part 32. The operator initiates a sanding (or other surface treatment) operation by actuating the toggle switches 64 which cause a start-of-cycle signal 59 to be sent to the controller 52. The drive assembly 38 functions to both clamp the rover device 30 on the part 32 as well as drive it along the length of the part 32. The idler assembly 40 also clamps and centers rover device 30 on the part 32. The sander assembly 42 may comprise, for example and without limitation, a pair of orbital sanders which sand opposite surfaces 34a of the blade 34, however as will be pointed out later, other power driven surface treatment tools, including material removal tools may be employed instead of sanders. Material 45 removed by the sander assembly 42 is drawn away from the rover device 30 by the vacuum assembly 44 to a vacuum and collector 46 which may comprise any suitable device that generates a vacuum and has a receptacle for collecting the material 45. When the rover device 30 has traversed the length of the part 32, the sensor assembly 48 senses the end 32b of the part 32 and delivers an end-of-part signal 57 to the controller 52 which responds by de-energizing and disengaging the rover device 30 from the part 32.

Figure 4A:
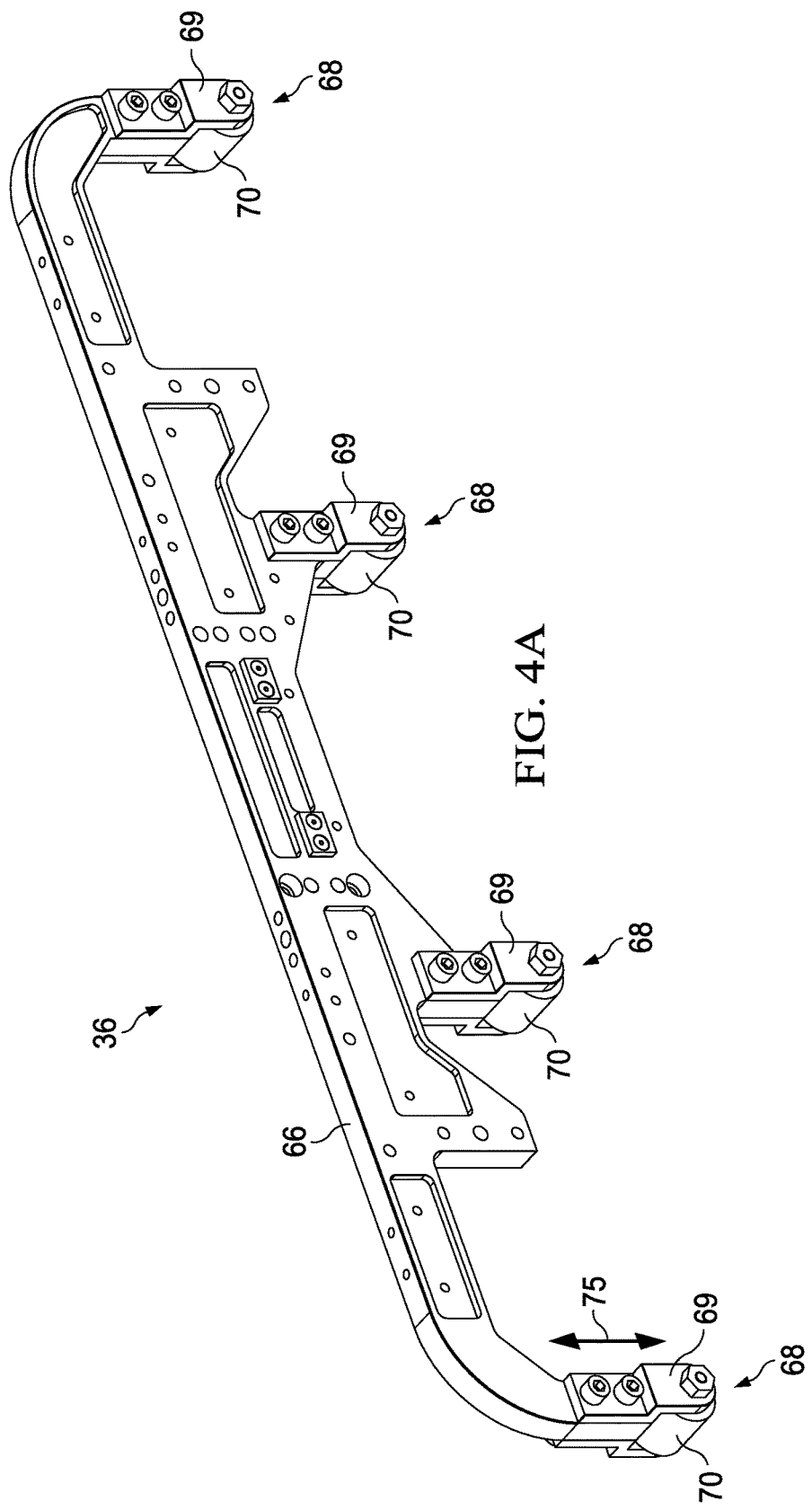
FIG. 4A is an illustration of a perspective view of the frame assembly forming part of the rover device.
Figure 4B:
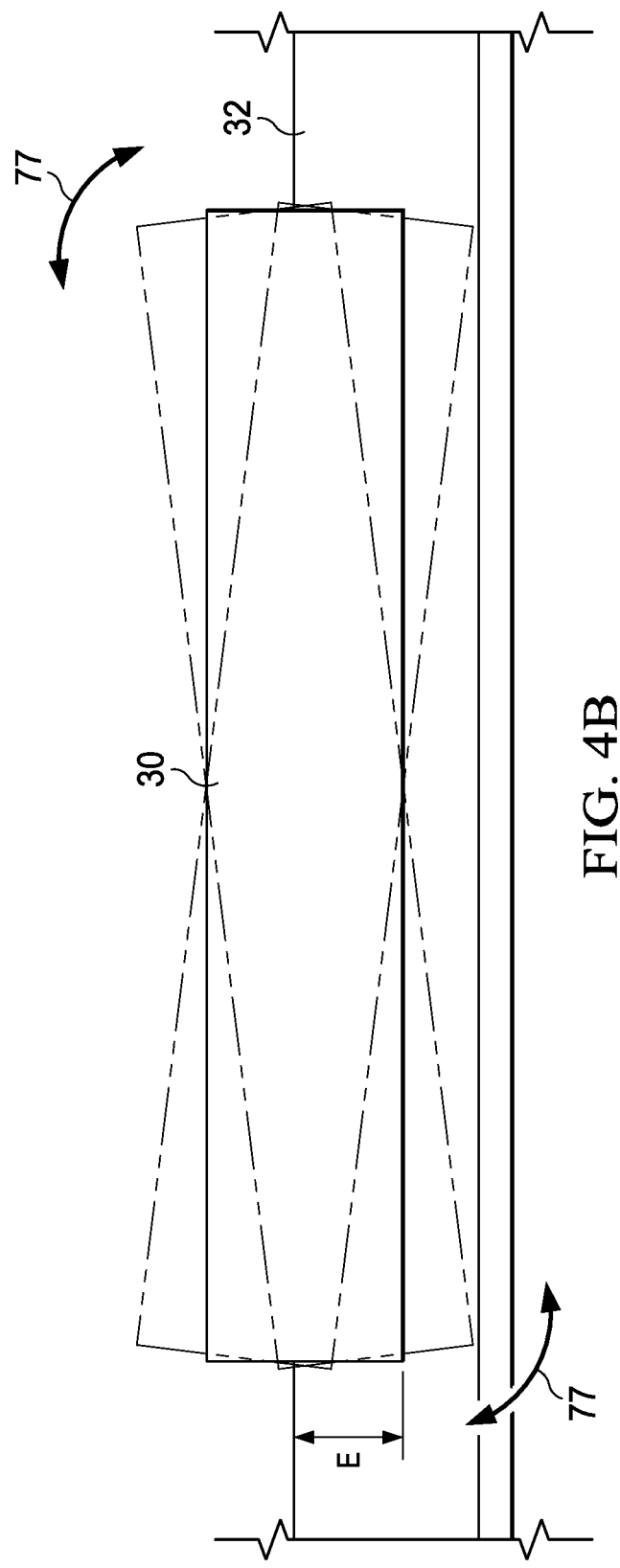
FIG. 4B is an illustration of a diagrammatic side view showing use of the idler assembly to adjust the pitch of the rover device on a part.

Referring now to FIGS. 4A and 4B, the frame assembly 36 comprises an elongate, one-piece frame backbone 66 formed of any suitable rigid material such as aluminum. Four longitudinally spaced apart idler arm assemblies 68 are mounted on the frame backbone 66 and are adjustable 75 in height to allow adjustment of the pitch 77 (FIG. 4B) as well as the elevation "E" of the rover device 30 relative to the part 32. The idler arm assemblies 68 effectively control sanding height and angle of attack of later-discussed sanders forming part of the sander assembly 42. Each of the idler arm assemblies 68 includes an idler roller 70 mounted for rotation on an idler arm 69 which is mounted for vertical adjustment 75 on the frame backbone 66. The idler rollers 70 engage a portion of the part 32, which in the illustrated example, comprises the top 34c of the blade 34, and support the weight of the rover device 30 on the part 32.

Figure 5:
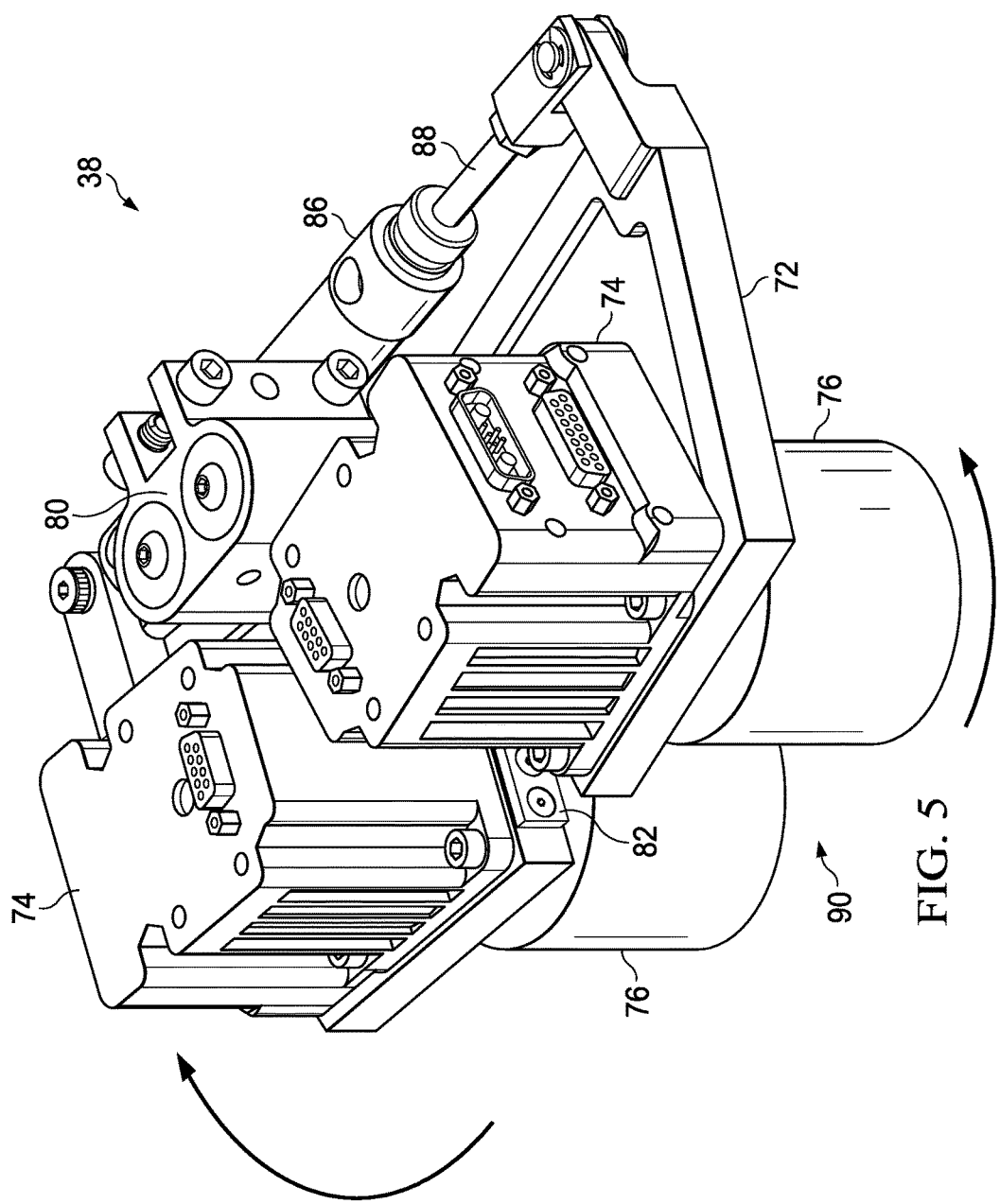
FIG. 5 is an illustration of an upper, front perspective view of a drive assembly forming part of the rover device.
Figure 6:
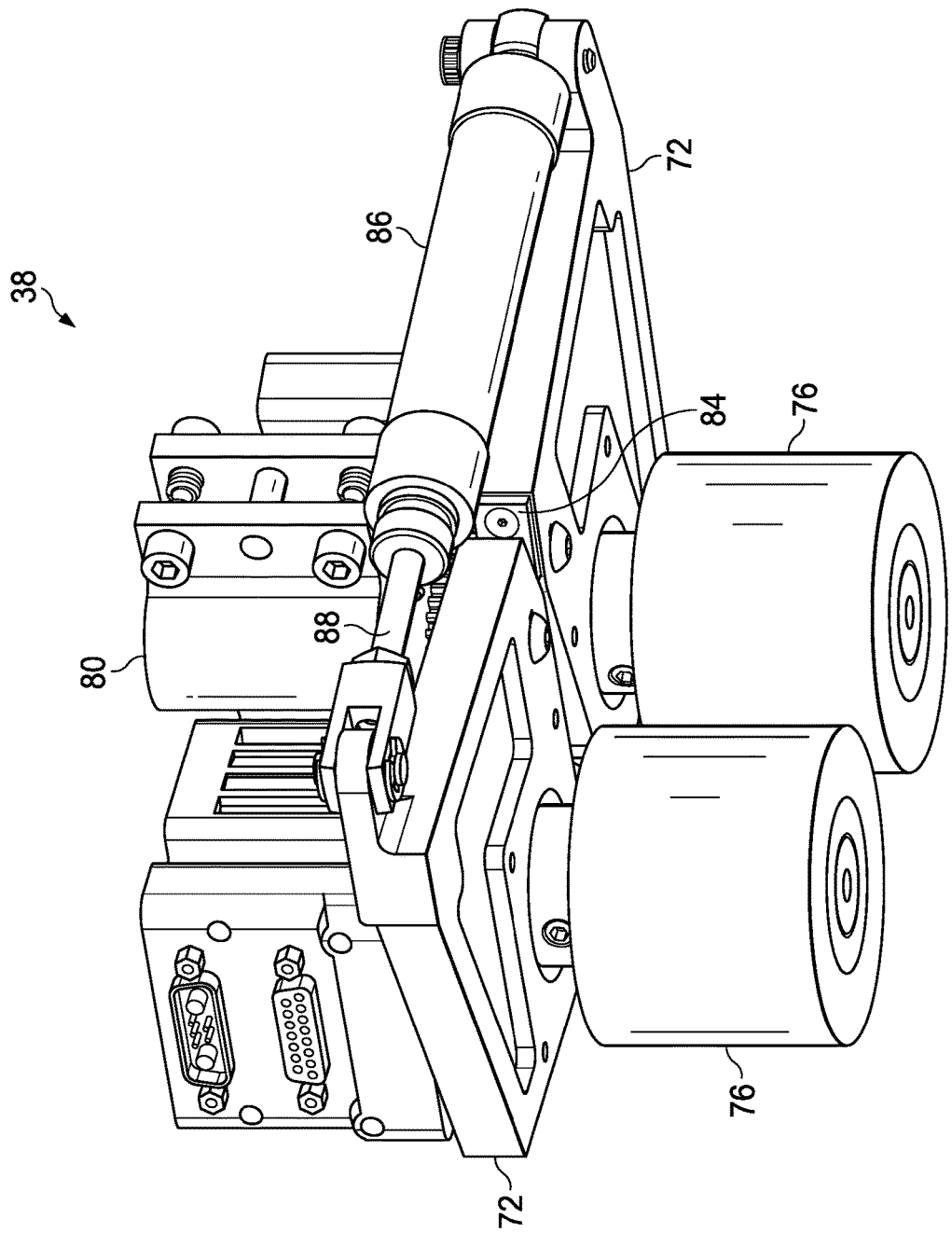
FIG. 6 is an illustration of a lower, rear perspective view of the drive assembly.
Figure 7:
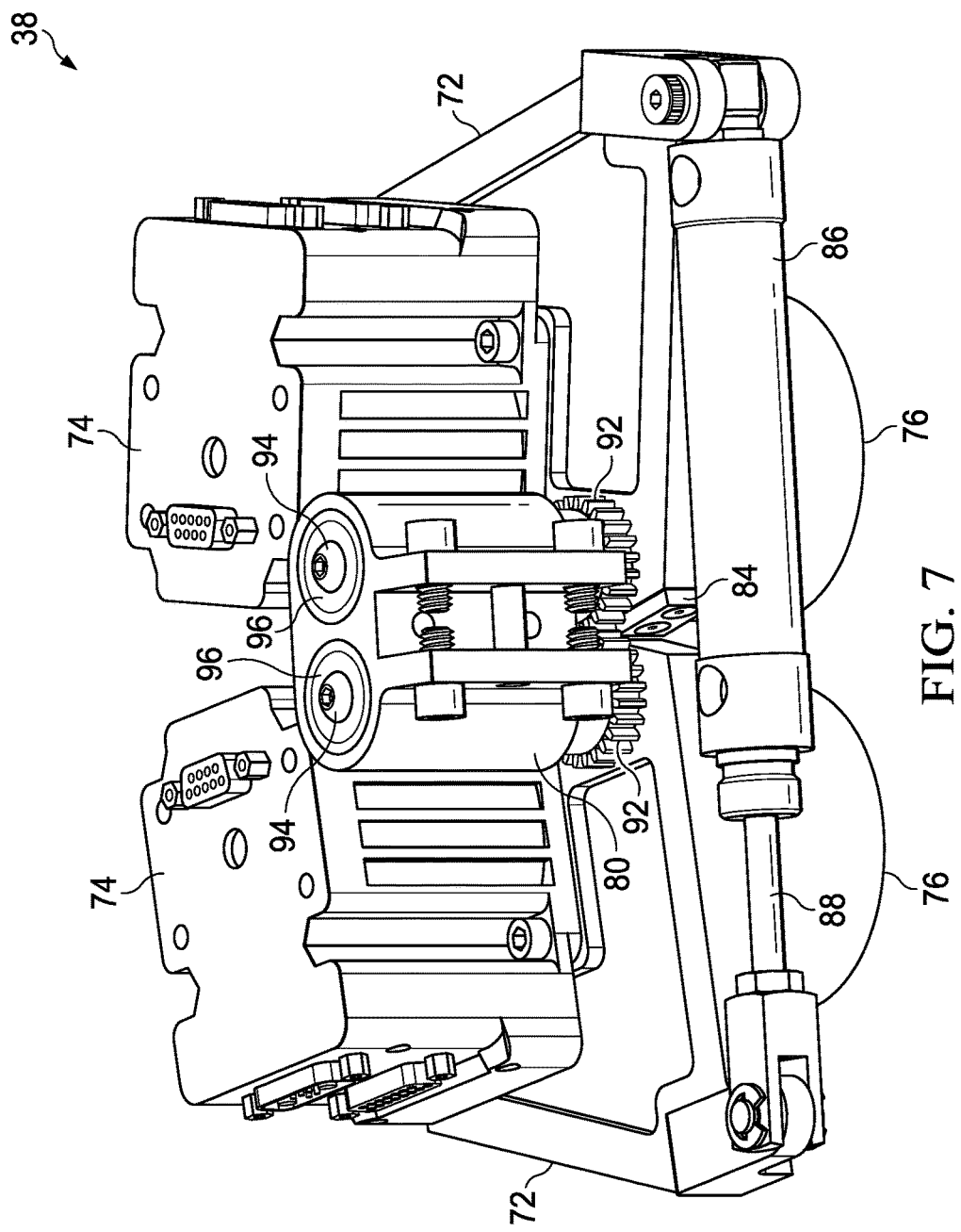
FIG. 7 is an illustration of a rear perspective view of the drive assembly.

Attention is now directed to FIGS. 5-7, which depict additional details of the self-centering drive assembly 38. The drive assembly 38 broadly comprises a pair of pivoting drive pincher members 72 arranged in side-by-side relationship. Drive rollers 76 respectively mounted on the drive pincher members 72 are driven by electric drive motors 74. The drive motors 74 are respectively mounted on the drive pincher members 72, and are controlled by the controller 52. The drive motors 74 may comprise, without limitation, commercially available, so-called smart motors which are programmable, integrated servo motor systems that include a motor, encoder, amplifier and a controller. The drive rollers 76 are formed of a material such as neoprene that is somewhat compliant but is capable of gripping the surfaces 34a of the blade 34. The drive pincher members 72 are geared together by a set of inter-meshed drive gears 92 (FIG. 7) respectively secured on the ends of shafts 94 which are held in bearings 96 within a bearing housing 80.

The drive pincher members 72, and thus the drive rollers 76, are pivoted toward and away from each other by a linear actuator 86. The pivotal movement of the drive pincher members 72 is limited by front and rear stops 82, 84 respectively. The linear actuator 86 may comprise, for example and without limitation, a pneumatic cylinder having one end pivotally connected to one of the drive pincher members 72, and the other end comprising an actuator rod 88 pivotally coupled to the other drive pincher members 72. The blade 34 of the stiffener 32 is received within a nip 90 (FIG. 5) and clamped between the two drive rollers 76. The amount of clamping force applied by the drive rollers 76 is determined by the linear actuator 86 and may be varied, depending on the application. It can be appreciated that since the two drive pincher members 72 are geared together, clamping the drive rollers 76 on the blade 34 results in centering of the forward end of the rover device 30 on the part 32.

Figure 8:
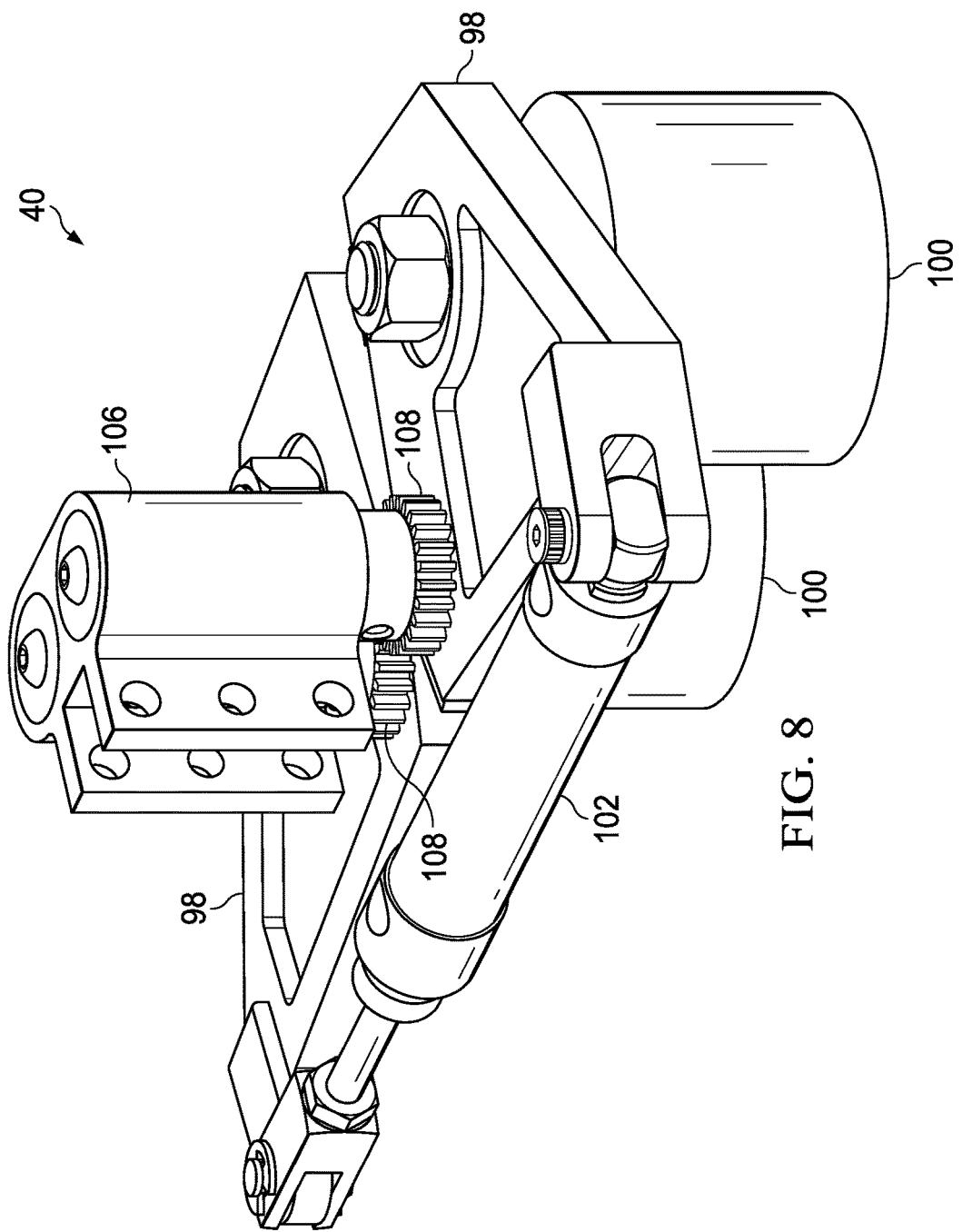
FIG. 8 is an illustration of a front perspective view of an idler assembly forming part of the rover device.
Figure 9:
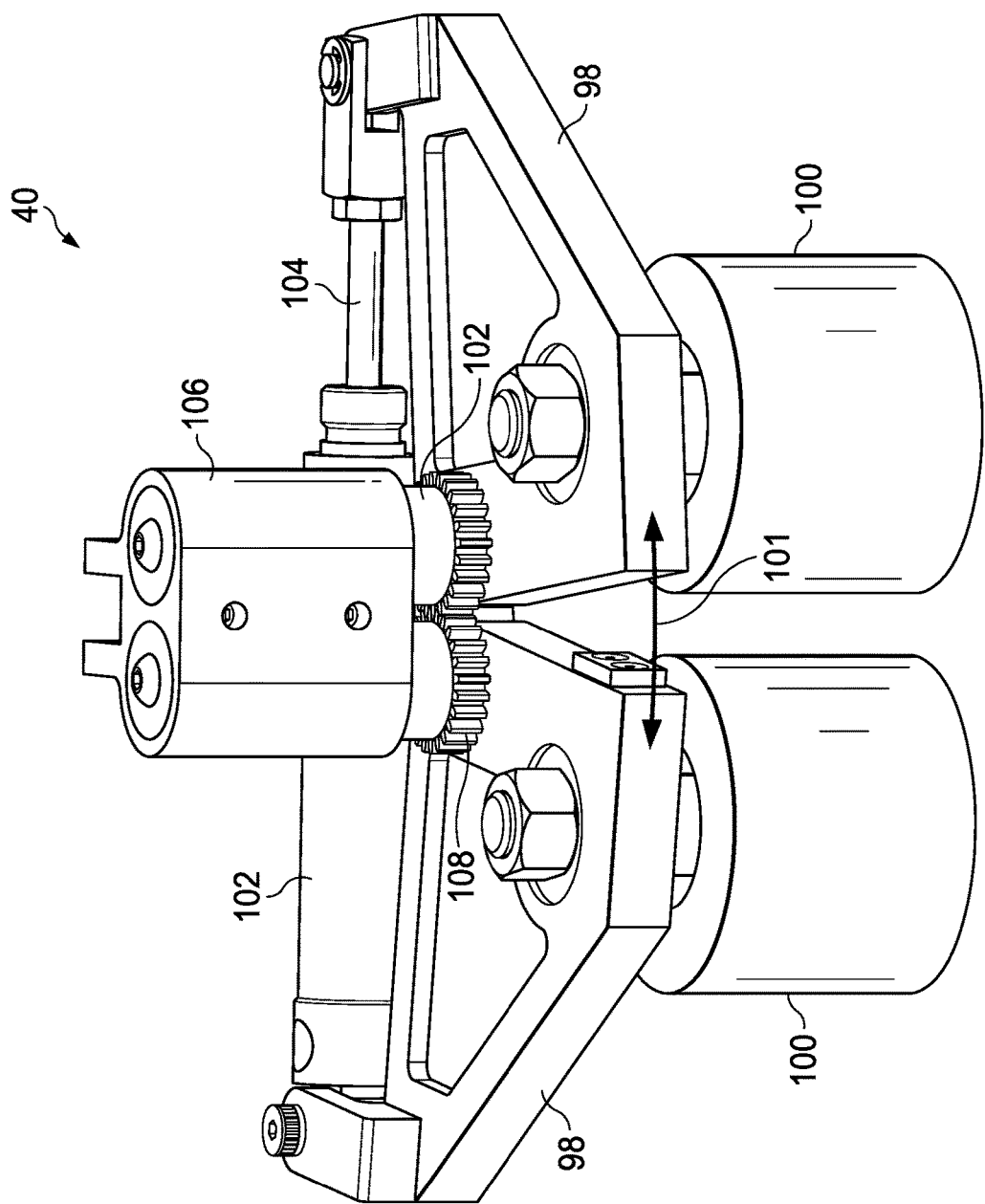
FIG. 9 is an illustration of a rear perspective view of the idler assembly.

FIGS. 8 and 9 illustrate additional details of the self-centering idler assembly 40, which is broadly similar in construction to the self-centering drive assembly 38 previously described. A pair of idler pincher members 98 are coupled together by a pair of inter-meshed gears 108 journaled for rotation within a bearing housing 106 that is similar in construction to the bearing housing 80 and related assembly previously described. A pair of idler rollers 100 are respectively mounted for rotation on the pincher members 98 and may be formed of a material similar to that of the drive rollers 76. The idler pincher members 98 are pivoted toward and away 101 from each other by a linear actuator 102 which may be similar in construction to the actuator 86 and has its opposite ends respectively pivotally connected to the idler pitcher members 98. The linear actuator 102 moves the idler rollers 100 into engagement with the surfaces 34a of the blade 34 and applies a force that clamps the rear end of the rover device 30 on the blade 34. Similar to the drive assembly 38 previously discussed, the idler assembly 40 is self-centering, resulting in centering of the rear section of the rover device 30 on the part 32.

Figure 10:
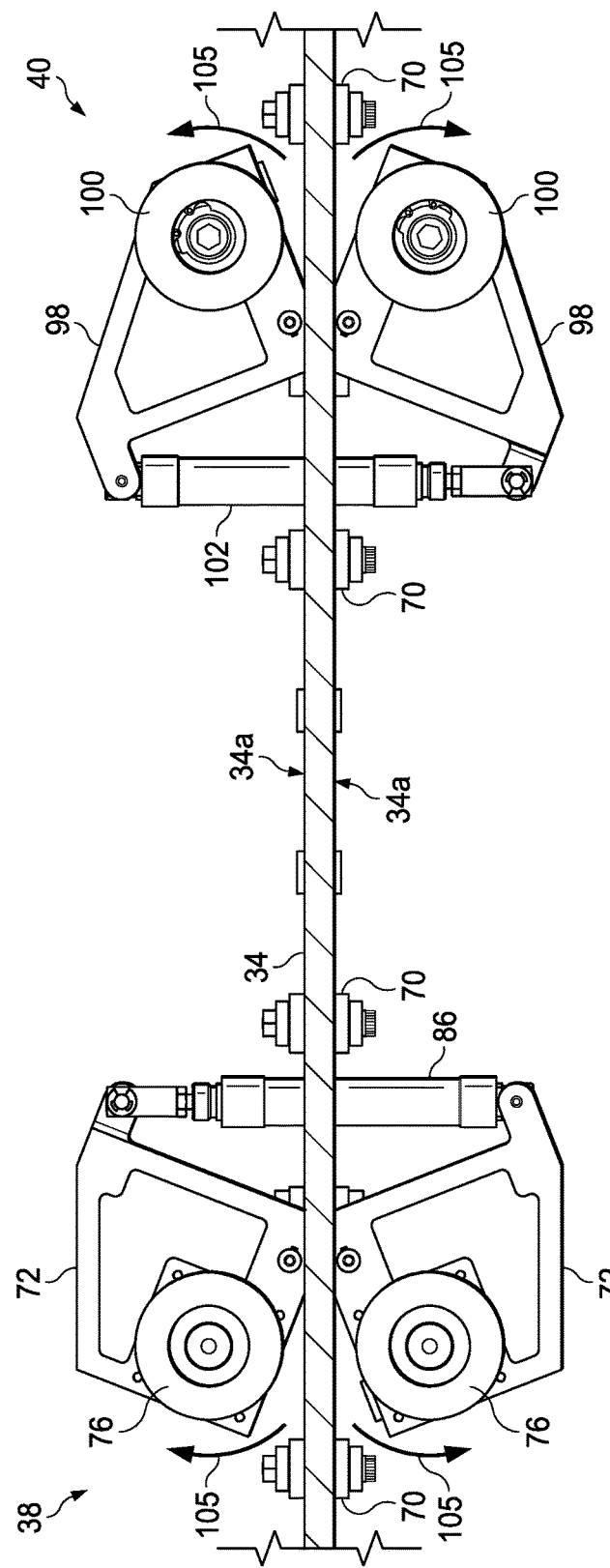
FIG. 10 is an illustration showing the drive rollers and idler rollers disengaged from the blade stiffener.
Figure 11:
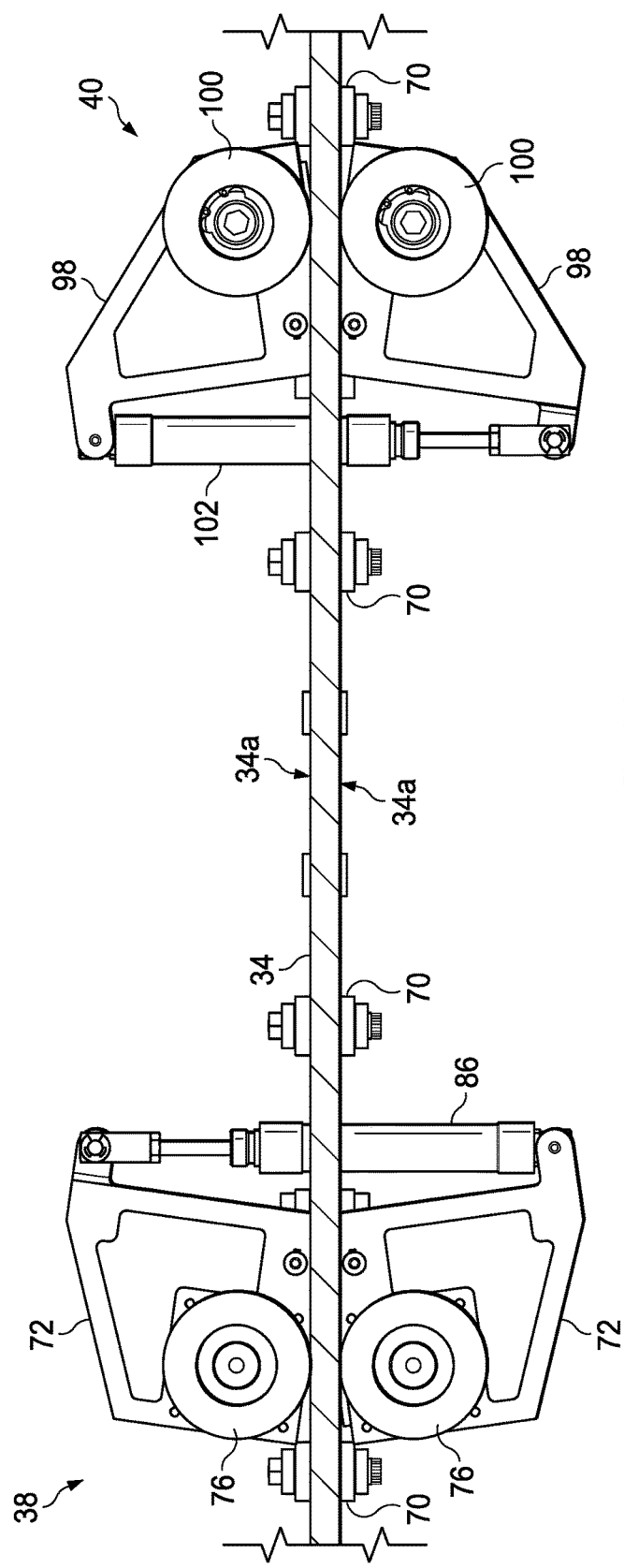
FIG. 11 is an illustration similar to FIG. 10, but showing the drive rollers and idler rollers engaging opposite surfaces of the blade stringer.

Reference is now made to FIGS. 10 and 11 which illustrate clamping and release of the rover device 30 on the part 32. In FIG. 10, both the drive assembly and an idler assembly 40 shown in their disengaged positions, with the drive rollers 76 and idler rollers 100 pivoted 105 outwardly, allowing the rover device 30 to either be placed on or removed from the stringer blade 34. FIG. 11 shows the actuators 86, 102 having pivoted the pincher members 72, 98 to their operative positions in which the drive rollers 76 and the idler rollers 100 engaged the surfaces 34a of the blade 34 and apply a clamping force which both centers and clamps the rover device 30 on the stringer blade 34.

Figure 12:
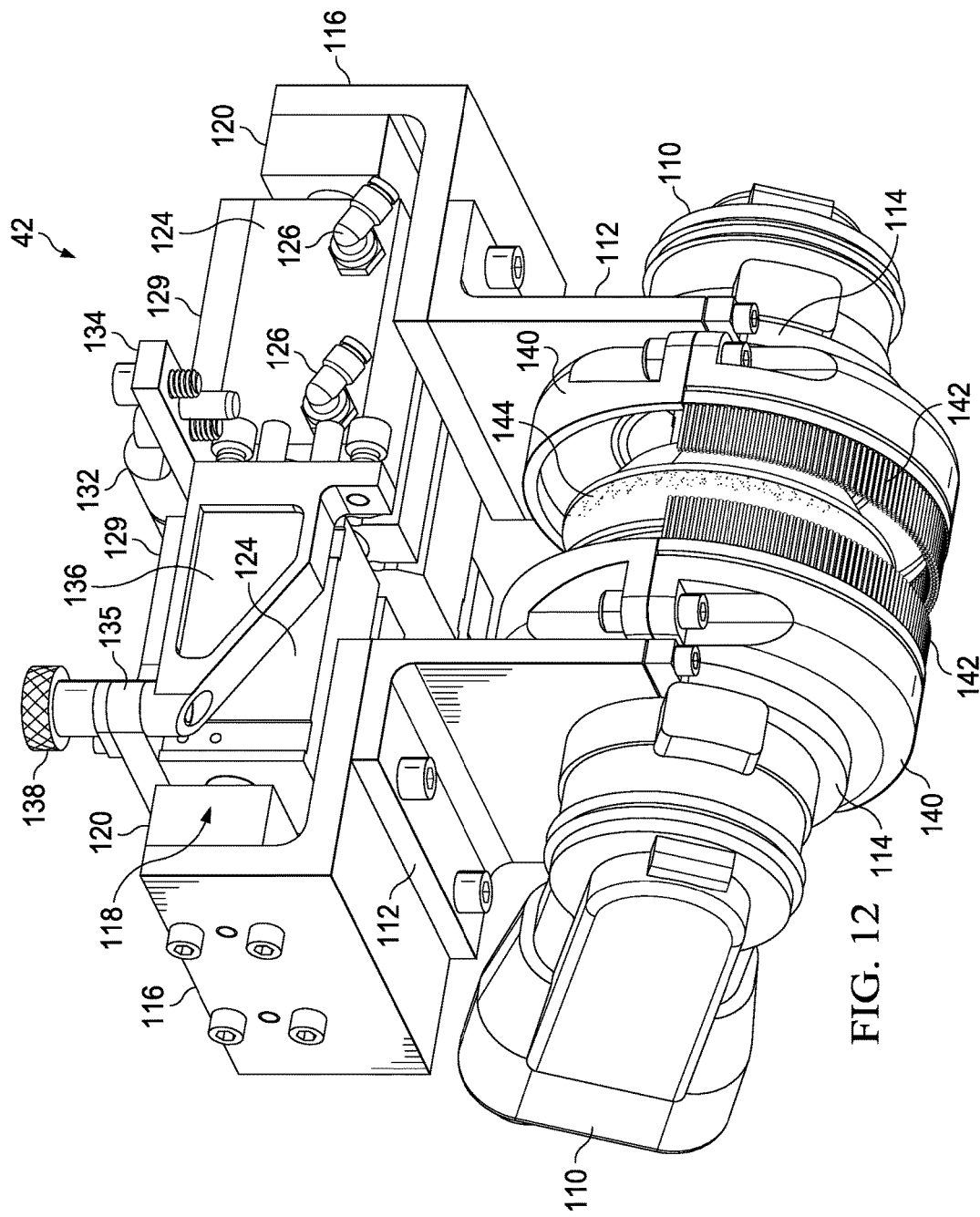
FIG. 12 is an illustration of a lower, front perspective view of a sander assembly forming part of the rover device.
Figure 13:
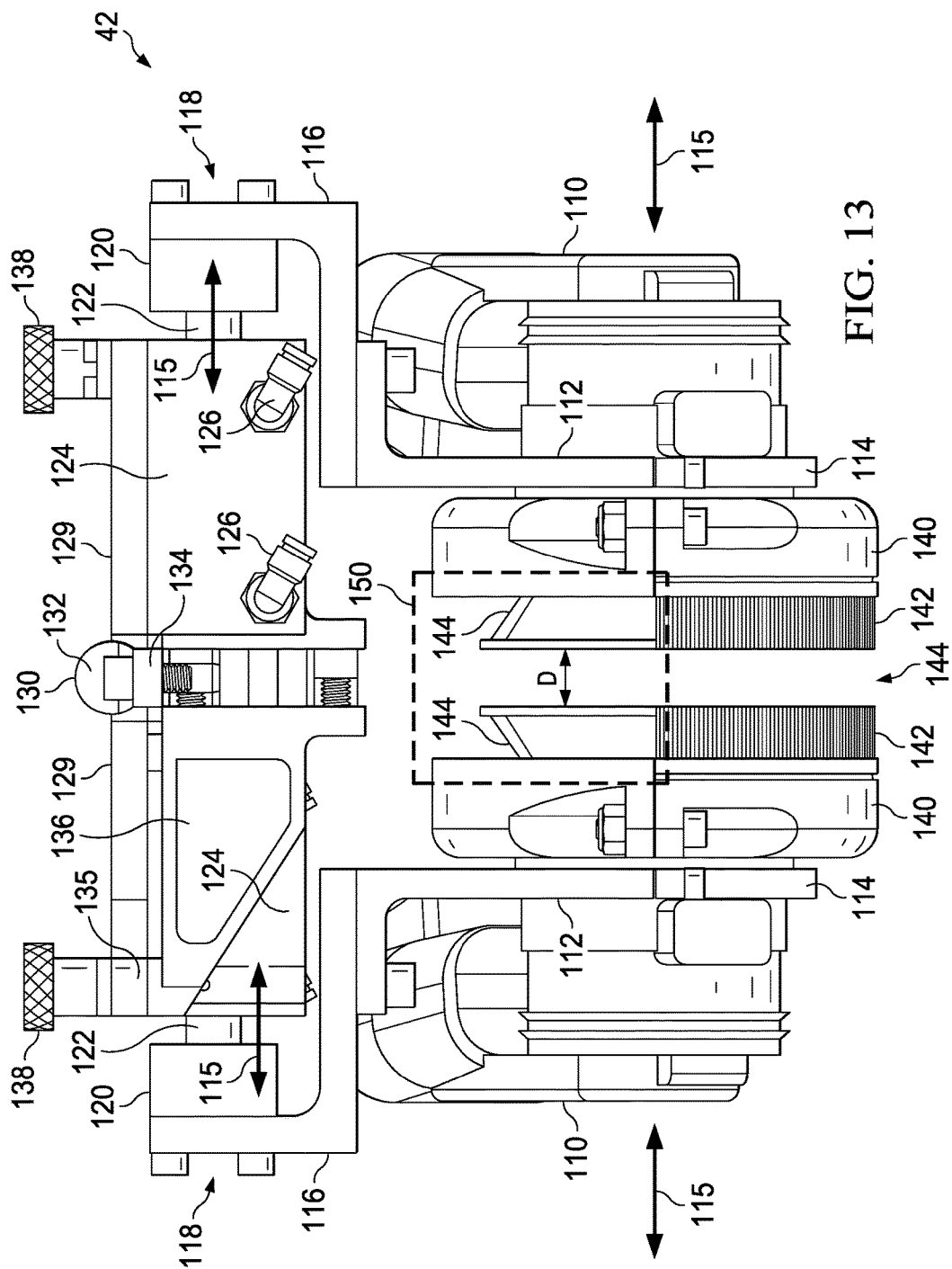
FIG. 13 is an illustration of a front view of the sander assembly.
Figure 14:
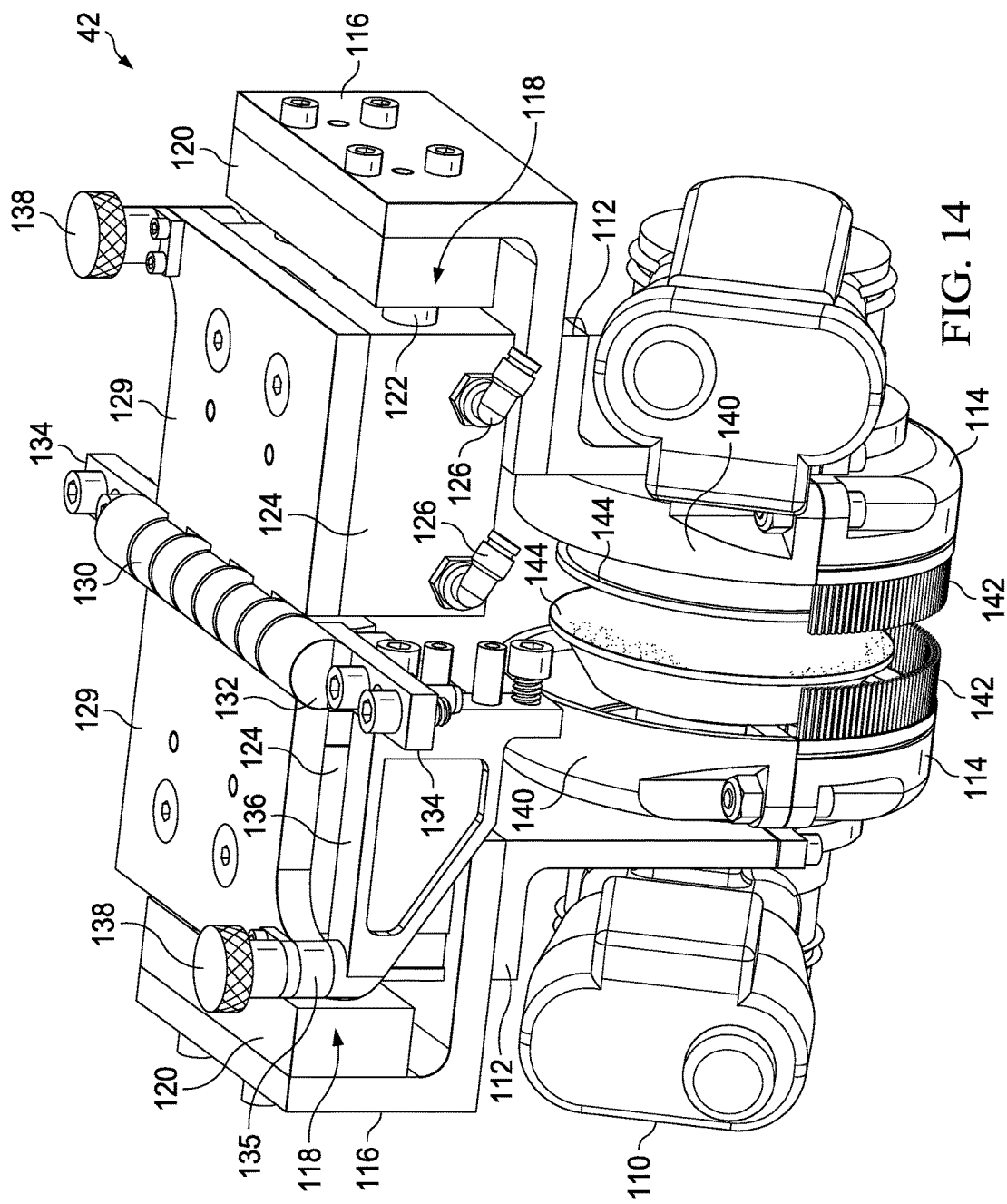
FIG. 14 is an illustration of an upper, rear perspective view of the sander assembly.

Attention is now directed to FIG. 12-14 which illustrate additional details of the sander assembly 42. A pair of sanders 110 are respectively mounted in face-to-face opposing relationship on a pair of lower sander brackets 112. In the illustrated example, the sanders 110 may comprise, for example and without limitation, an orbital sander, however as previously mentioned, other well-known surface treatment tools, including material remover tools such as grinders or polishers may be employed, depending on the application. Each of the sanders 110 includes a sander head 144 provided with a sanding pad (not shown) or similar element, suitable for removing material from the surfaces 34a of the blade 34.

Each of the sander heads 144 is surrounded by a sander shroud 140 which forms a partial enclosure around the sander head 144. The lower portions of each of the sander shrouds 140 are provided with a set of flexible bristles 142 or similar flexible members which are adapted to engage the surfaces 34a of the blade 34 as the rover device 30 moves along the length of the stiffener 32. The flexible bristles 142 function to prevent the escape of material such as sanding dust that has been generated by the sanders 110, yet allows passage of the blade 34 between the sander heads 144. Consequently the combination of the bristles 142 and sander shrouds 140 form an enclosure that substantially completely surrounds and encloses the sander heads 144, thereby preventing escape of air-borne materials such as sanding dust generated by the sanders 110. As later discussed, a vacuum shroud 150, the position of which is shown in broken lines in FIG. 13, encloses the upper portions of the area surrounding the sander heads 144 and functions to collect the air-borne materials.

Each of the lower sander brackets 112 is mounted to a corresponding upper sander bracket 116. In some examples, the lower and upper sander brackets 112, 116 may comprise a single dog-leg bracket (not shown). Each of the upper sander brackets 116 is mounted on a powered linear slide 118 which moves the corresponding sander brackets 112, 116, and thus the sanders 110, laterally 115. The lateral movement of the sanders 110 by the linear slides 118 allows adjustment of the distance "D" between the two sander heads 144 to match the width of the blade 34. The linear slide 118 also allow adjustment of the pressure applied by the sander heads 144 to the surfaces 34a of the blade 34.

Figure 15:
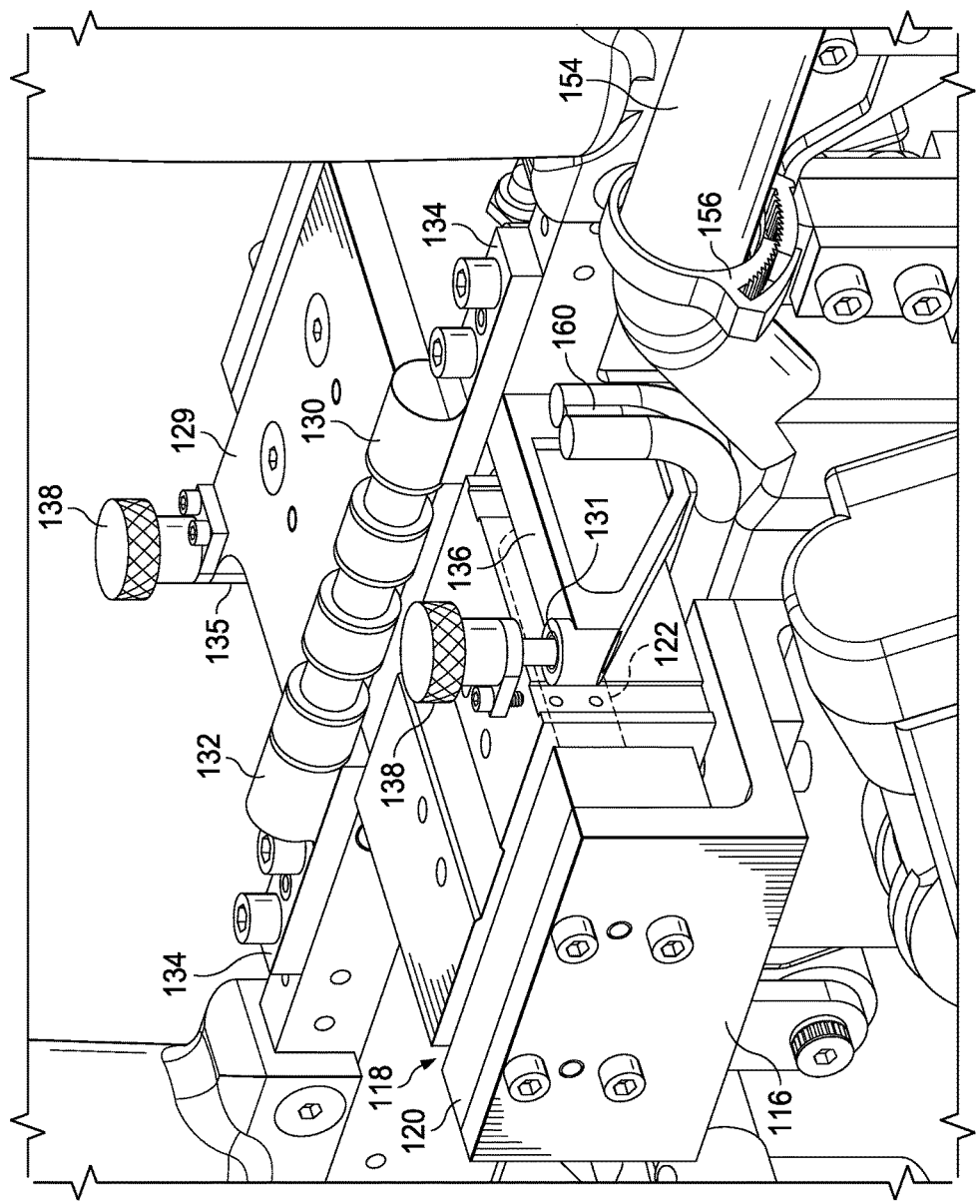
FIG. 15 is an illustration of an upper perspective view of the slides forming part of the sander assembly, one of the hinge plates shown in the phantom to better reveal piston rods forming part of a slide.

Each of the linear slides 118 comprises a pneumatic cylinder 124 provided with cylinder rods 122. The upper brackets 116 are attached to plates 120 that are fixed to the outer ends of the cylinder rods 122. Each of the pneumatic cylinders 124 is provided with pneumatic fittings 126 that are coupled with a source of pressurized air (not shown) that is adjusted by pressure regulators 56 (FIG. 1) forming part of the controller 52. Each of the pneumatic cylinders 124 is attached to the bottom of a corresponding hinge plate 129 forming part of a hinge 130. As will be discussed later in more detail, the hinge 130 allows each of the sander assemblies 42 to be pivoted outwardly and upwardly, to permit servicing of the sander heads 144. Referring now also to FIG. 15, the hinge 130 includes a hinge pin 132 secured to a hinge pin mount 134 that is fixed to the frame backbone 66. Each of the hinge plates 129 includes an apertured hinge plate ear 135 that rests on a corresponding hinge stop 136. Each of the hinge stops 136 includes a threaded aperture 131. A threaded knob screw 138 passes through the hinge plate ear 135 and is received within the threaded aperture 131, thereby releasably securing the corresponding hinge plate 129 on one of the hinge stops 136.

Figure 16:
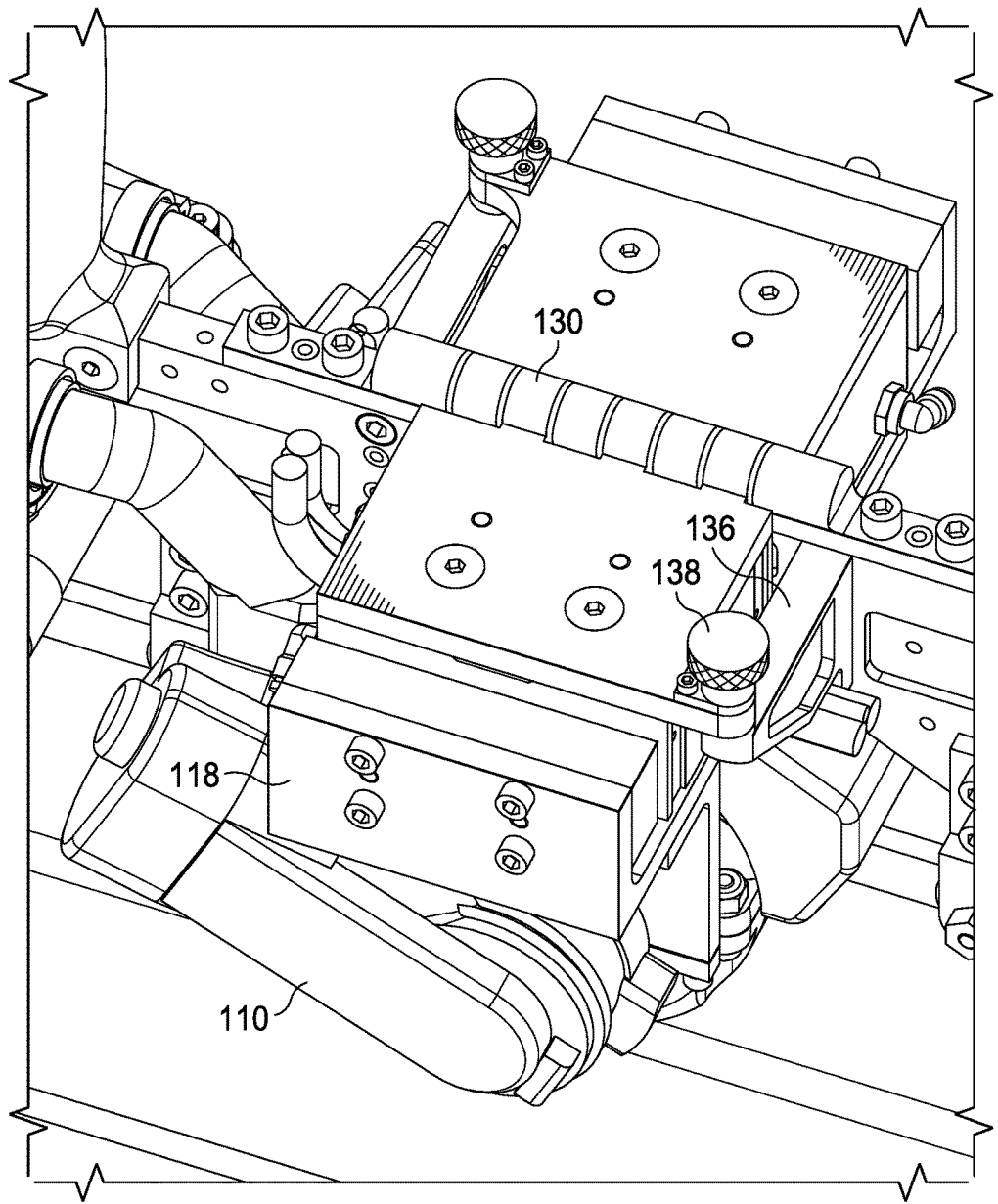
FIGS. 16-19 are illustrations of a top perspective view of the sander assembly, useful in explaining the process for servicing the sander heads.
Figure 17:
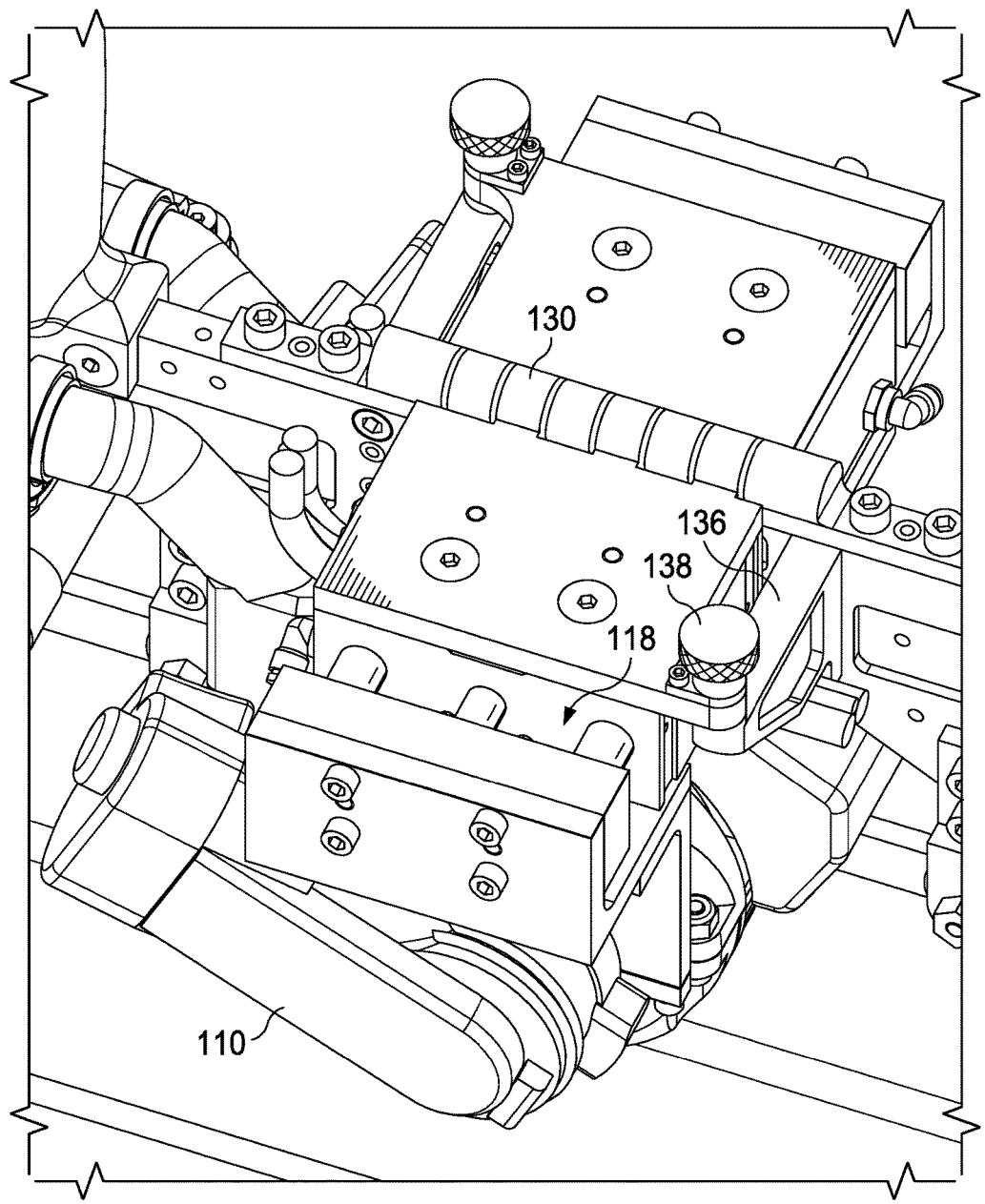
Figure 18:
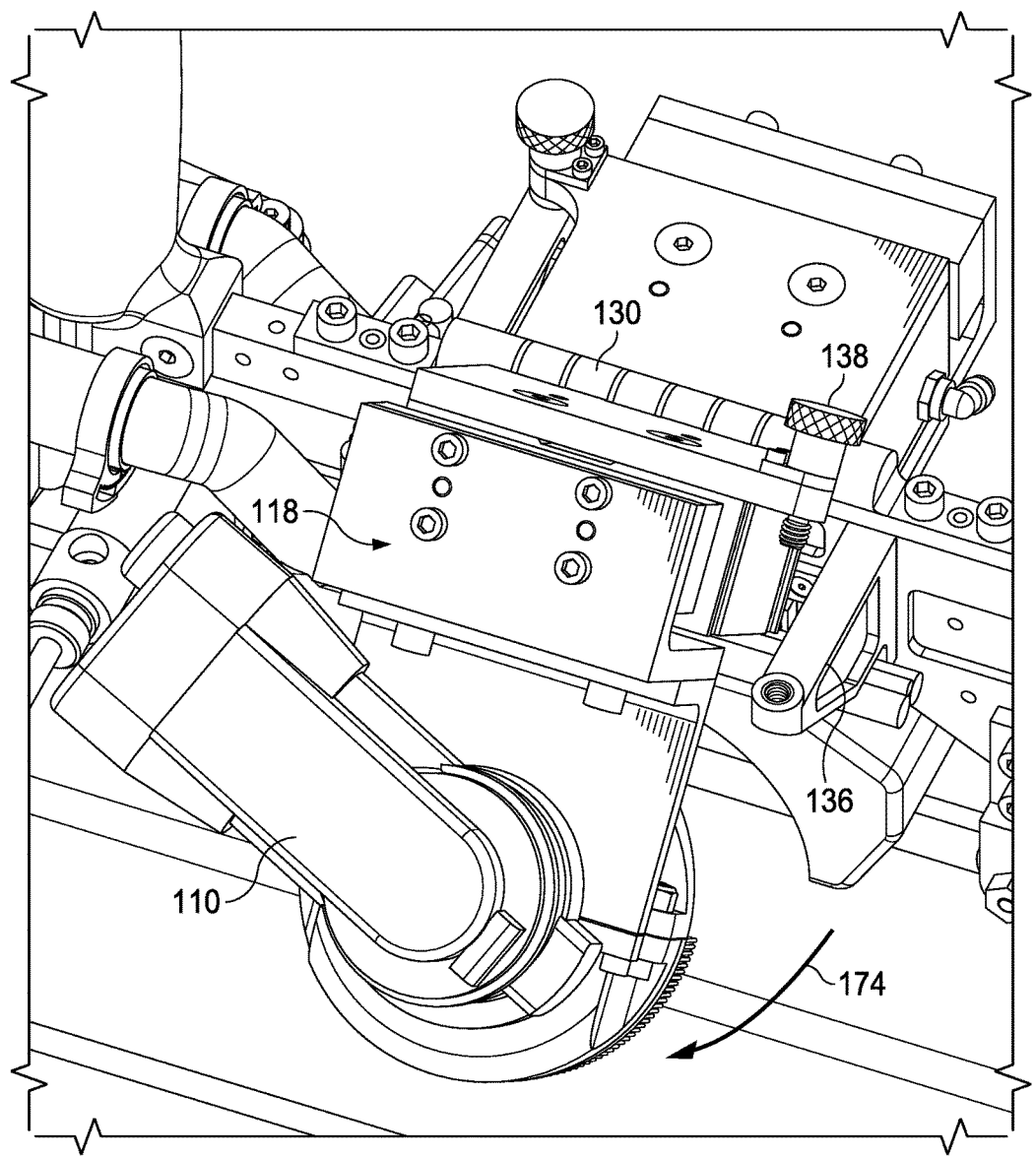
Figure 19:
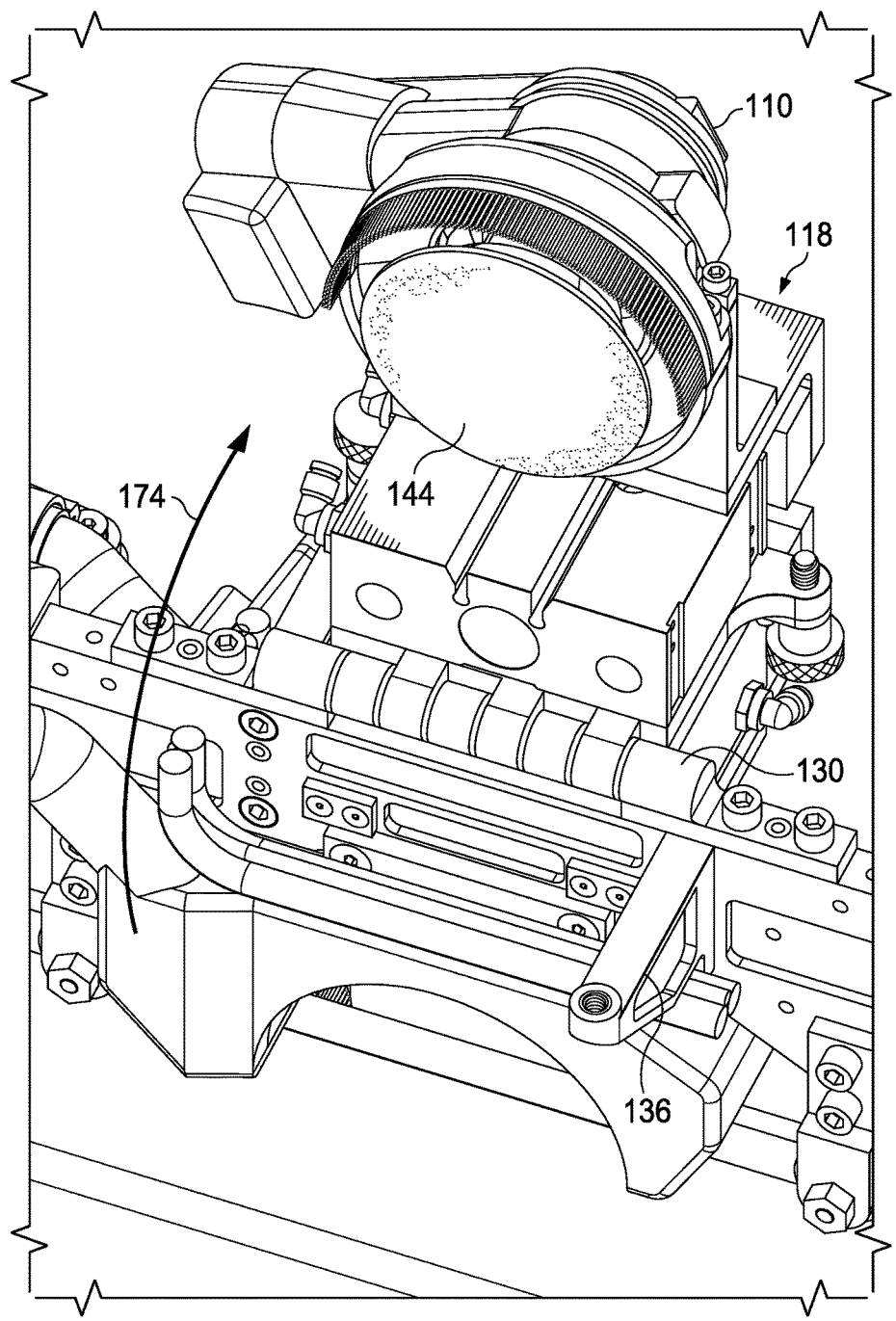

FIGS. 16-19 show how hinging of the sander assemblies 42 on the frame backbone 66 allows ready access to the sander heads 144 for servicing, such as to replace sanding pads. FIG. 16 shows the sander assemblies 42 in their operative locked positions in which the knob screws 138 lock them against pivotal movement, and the sander heads 144 engage the blade 34. In preparation for servicing of the sander heads 144, as shown in FIG. 17, the linear slides 118 are deactuated, thereby disengaging the sander heads 144 from the blade 34. Next, the knob screws 138 are unscrewed, thereby releasing the hinge plates 129 from the hinge stops 136. Then, as shown in FIGS. 18 and 19, the sander assemblies 42 are pivoted or swung 174 outwardly and upwardly to an open, service position where the sander heads 144 can be serviced or otherwise accessed. Following service of the sander heads 144, the sander assemblies 42 can be swung or pivoted back down to their operative positions, and the knob screws 138 are used to lock the hinge plates 129 to the hinge stops 136.

Figure 20:
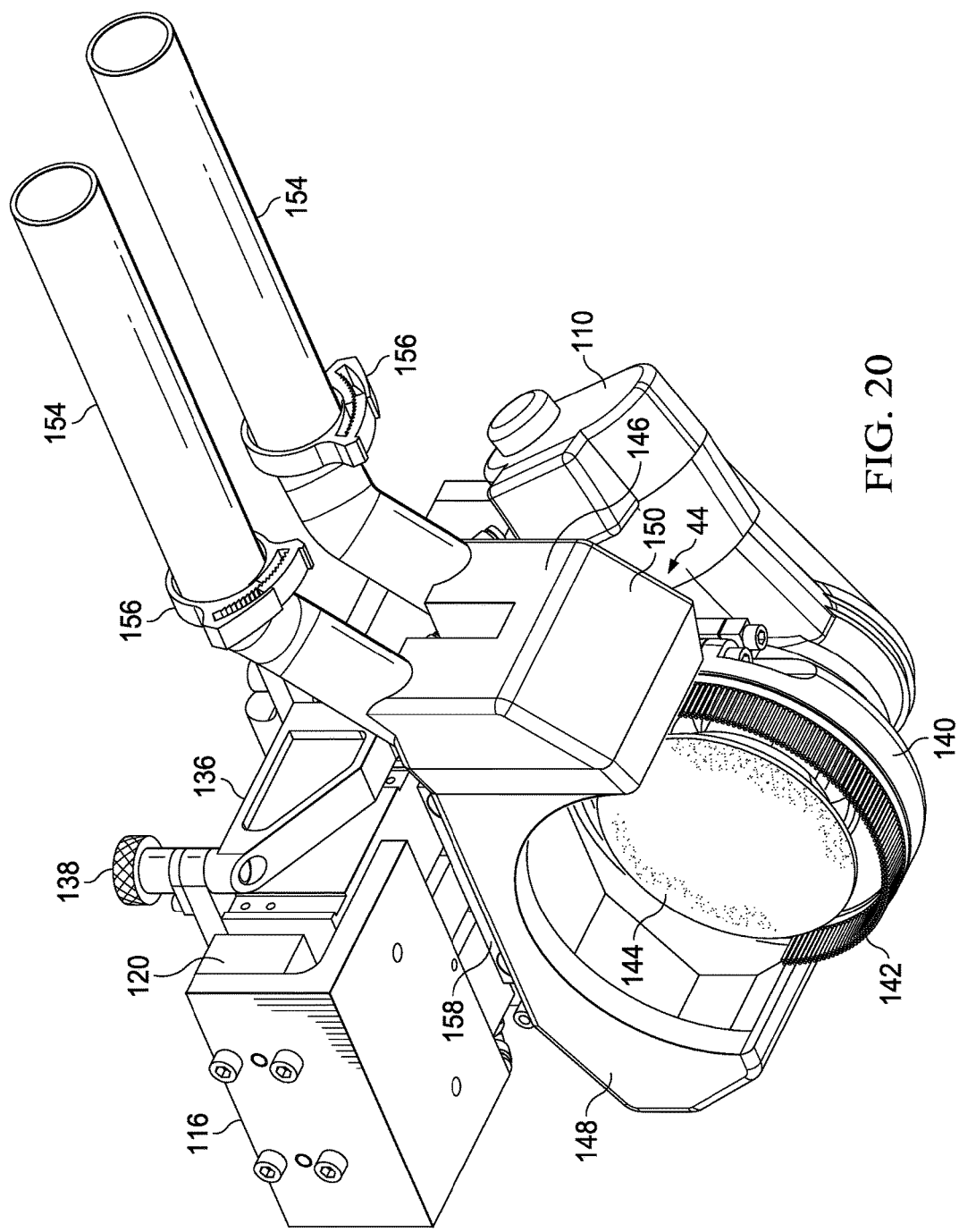
FIG. 20 is an illustration of a lower, rear view of a vacuum assembly forming part of the rover device.
Figure 21:
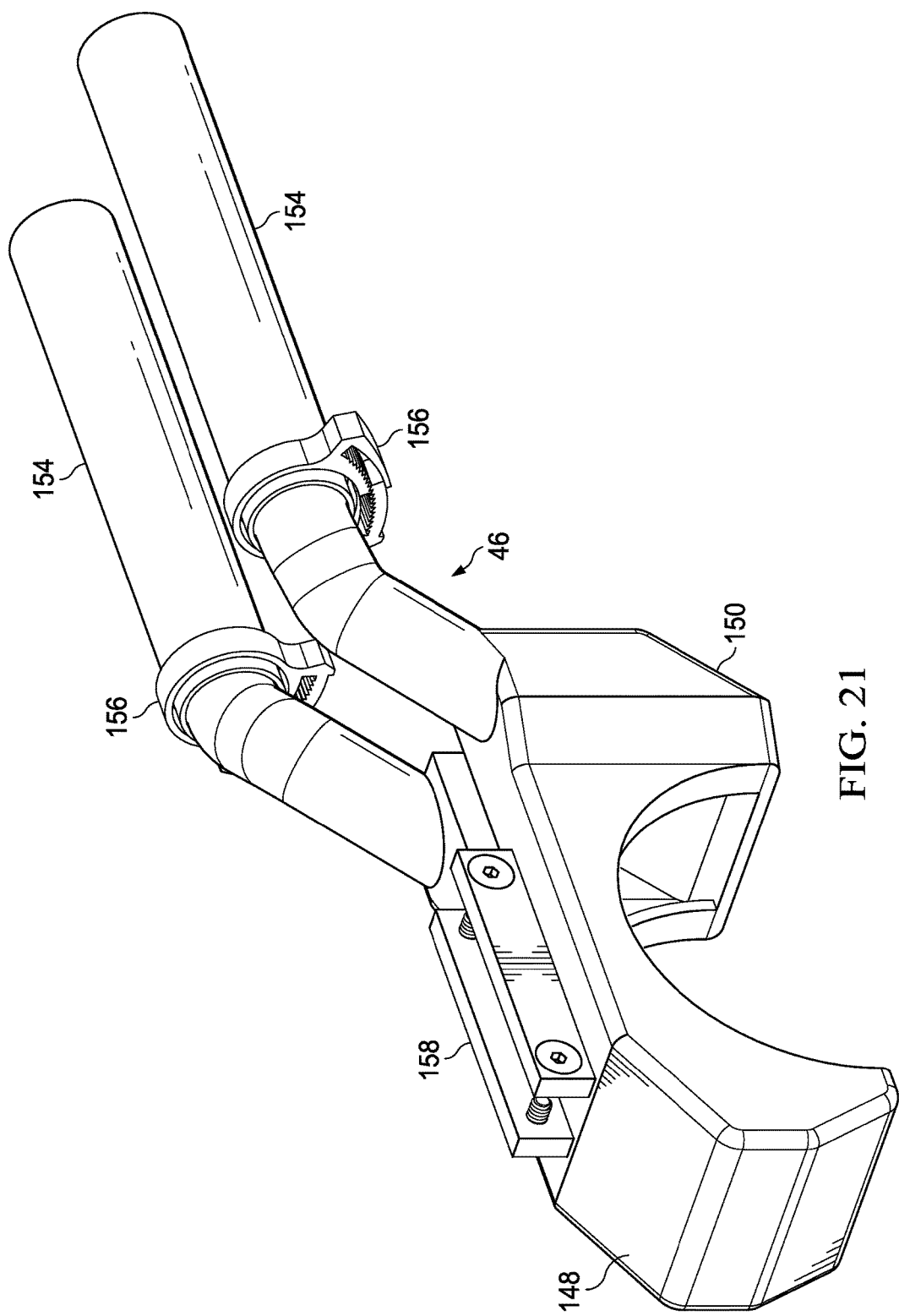
FIG. 21 is an illustration of a front perspective view of the vacuum assembly.

Attention is now directed to FIGS. 20 and 21 which illustrate additional details of the vacuum assembly 44 which collects and carries away material 45 (FIG. 1) such as sanding dust, generated by the sanders 110. The vacuum assembly 44 broadly comprises a pair of vacuum tubes 154 secured to the vacuum shroud 150 by a pair of clamps 156. The vacuum shroud 150 includes a housing 148 which, as previously mentioned, surrounds and encloses the upper areas surrounding the sander heads 144. As best seen in FIG. 21, a mounting bracket 158 on the top of the vacuum housing 148 is provided for mounting the vacuum assembly 44 on the frame backbone 66.

Figure 22:
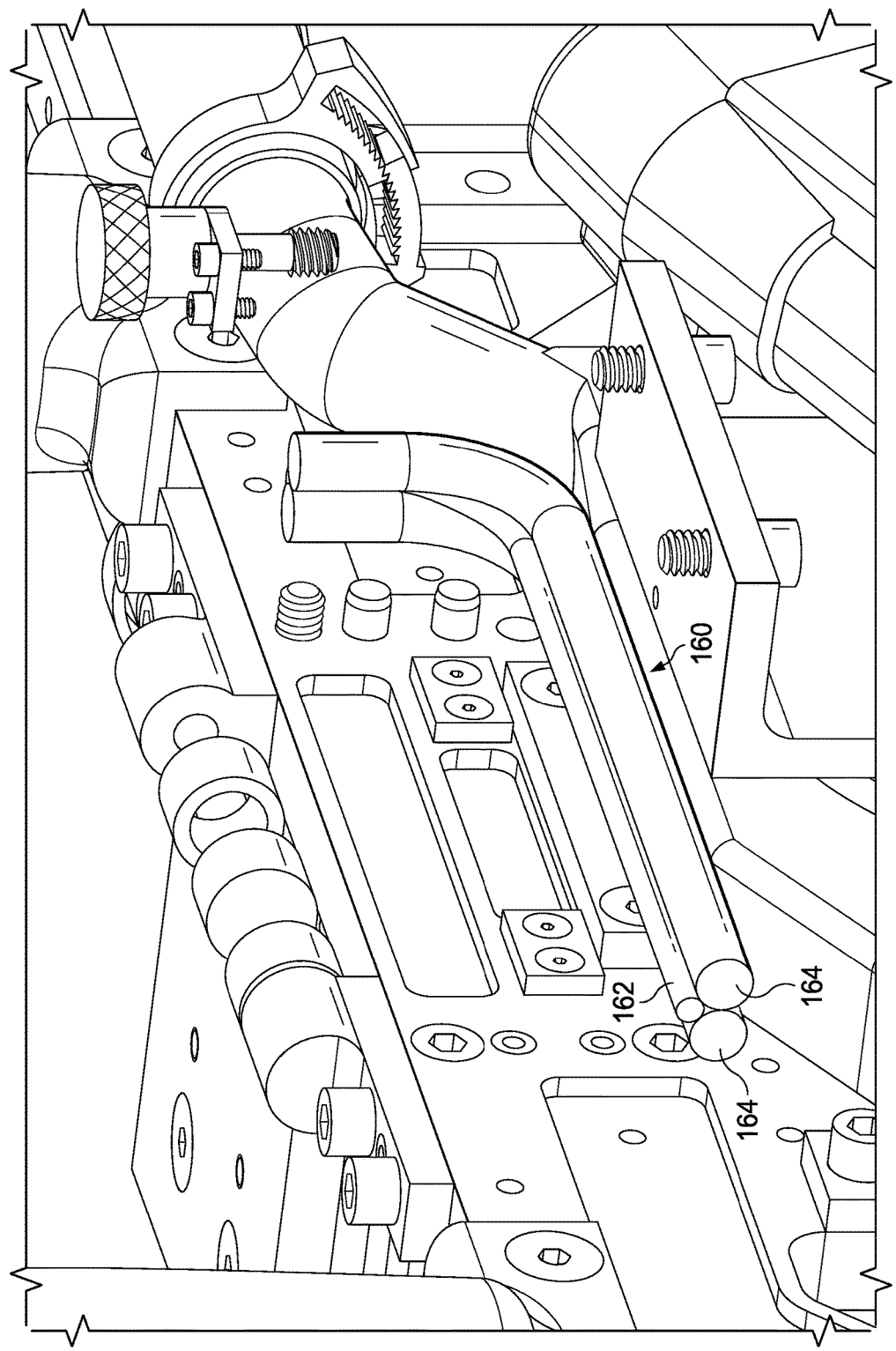
FIG. 22 is an illustration of a hose and wire assembly forming part of the rover device.

Referring now to FIG. 22, the rover device 30 is coupled with the controller 52 and the vacuum/collector 46 using a hose and wire assembly 160 that includes a wire conduit 162 and a hose conduit 164 for protectively enclosing and routing pneumatic hoses and electrical wiring.

Figure 23:
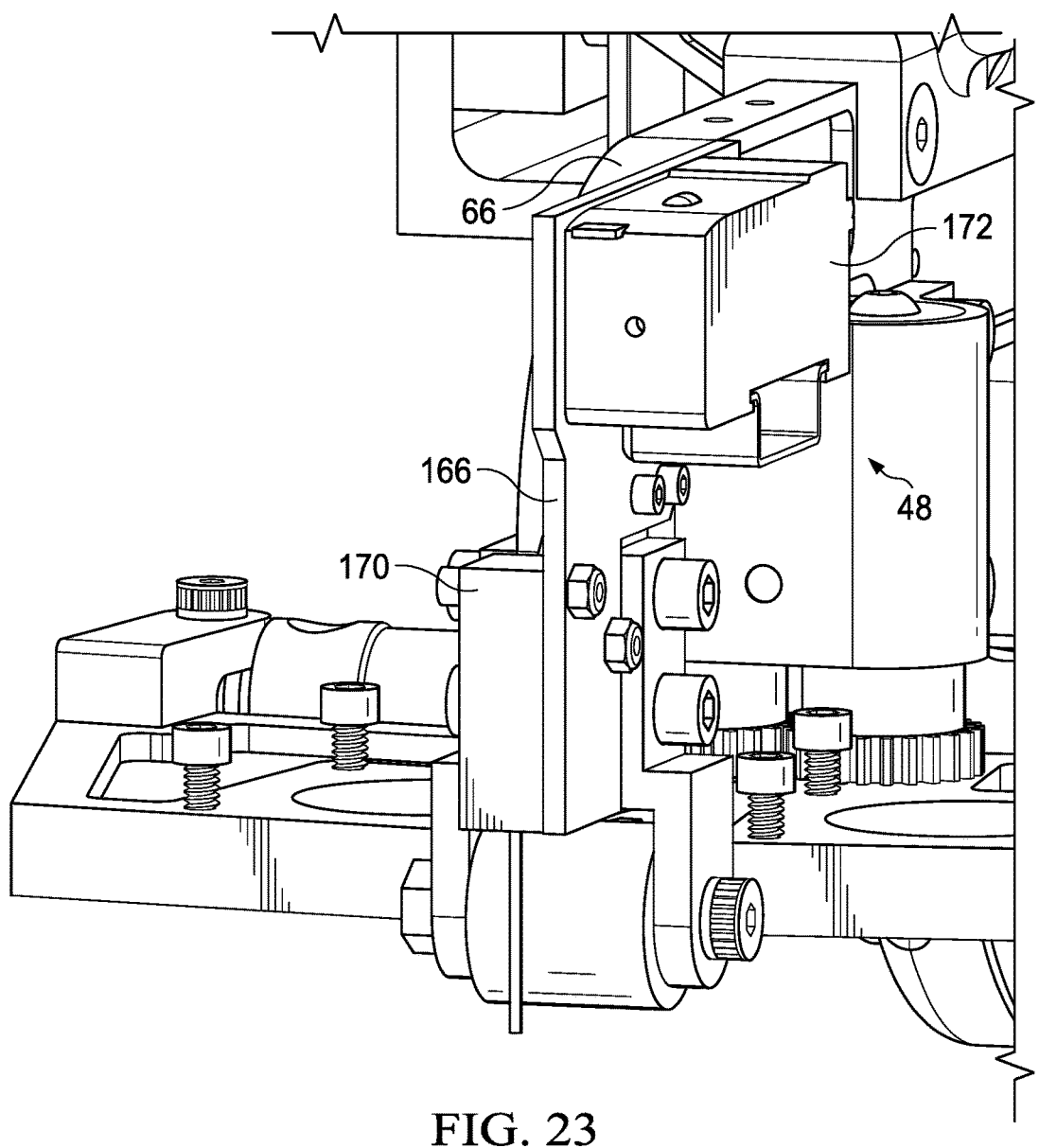
FIG. 23 is an illustration of a front perspective view of a sensor assembly forming part of the rover device.
Figure 24:
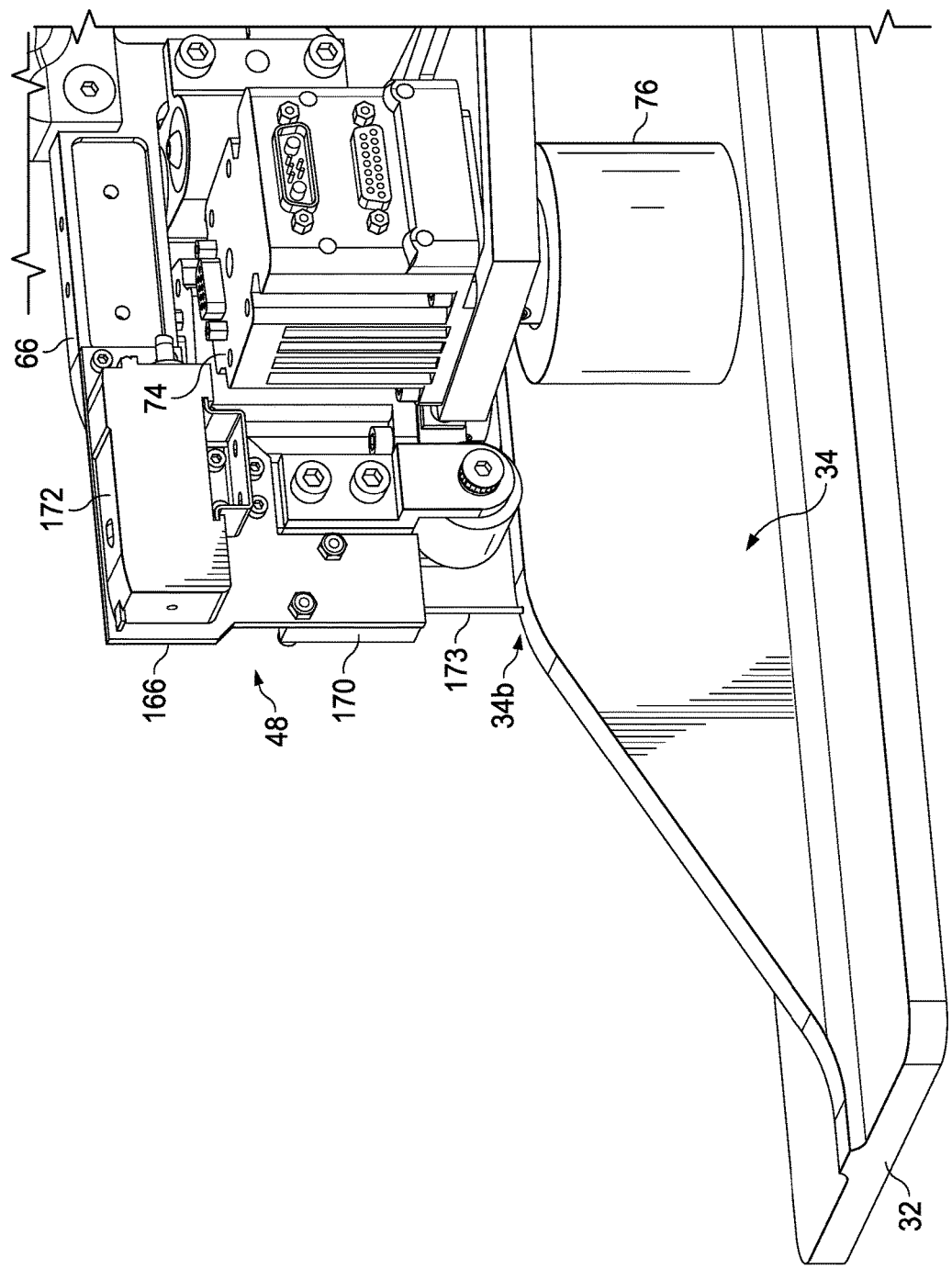
FIG. 24 is an illustration of an end perspective view showing a sensor sensing the end of the stiffener.

Attention is now directed to FIGS. 23 and 24 which illustrate details of the sensor assembly 48 which, as previously mentioned, functions to detect when the Rover device reaches the end of the part 32. In the illustrated example, the sensor assembly senses the end 34b of the blade 34, however depending on the application, other part features indicating an end of the part can be sensed. The sensor assembly 48 comprises a sensor 170 mounted on a bracket 166 that is secured to the forward end of the frame backbone 66. The sensor 170 may comprise, for example and without limitation, a laser sensor that projects a laser beam 173 onto the part 32, and more particularly onto the top 34c (FIG. 3) of the blade 34. Laser beam light reflected from the top 34c of the blade 34 is sensed by the sensor 170 which then generates and delivers the end-of-part signal 57 (FIG. 1) to the controller 52, signaling that the end of the part 32 has been reached by the rover device 30. Other types of feature or position sensors may be employed in lieu of a laser sensor. Depending on the application, an amplifier 172 may be employed for increasing the signal strength of the end-of-part signal 57 before transmission to the controller 52.

Figure 25:
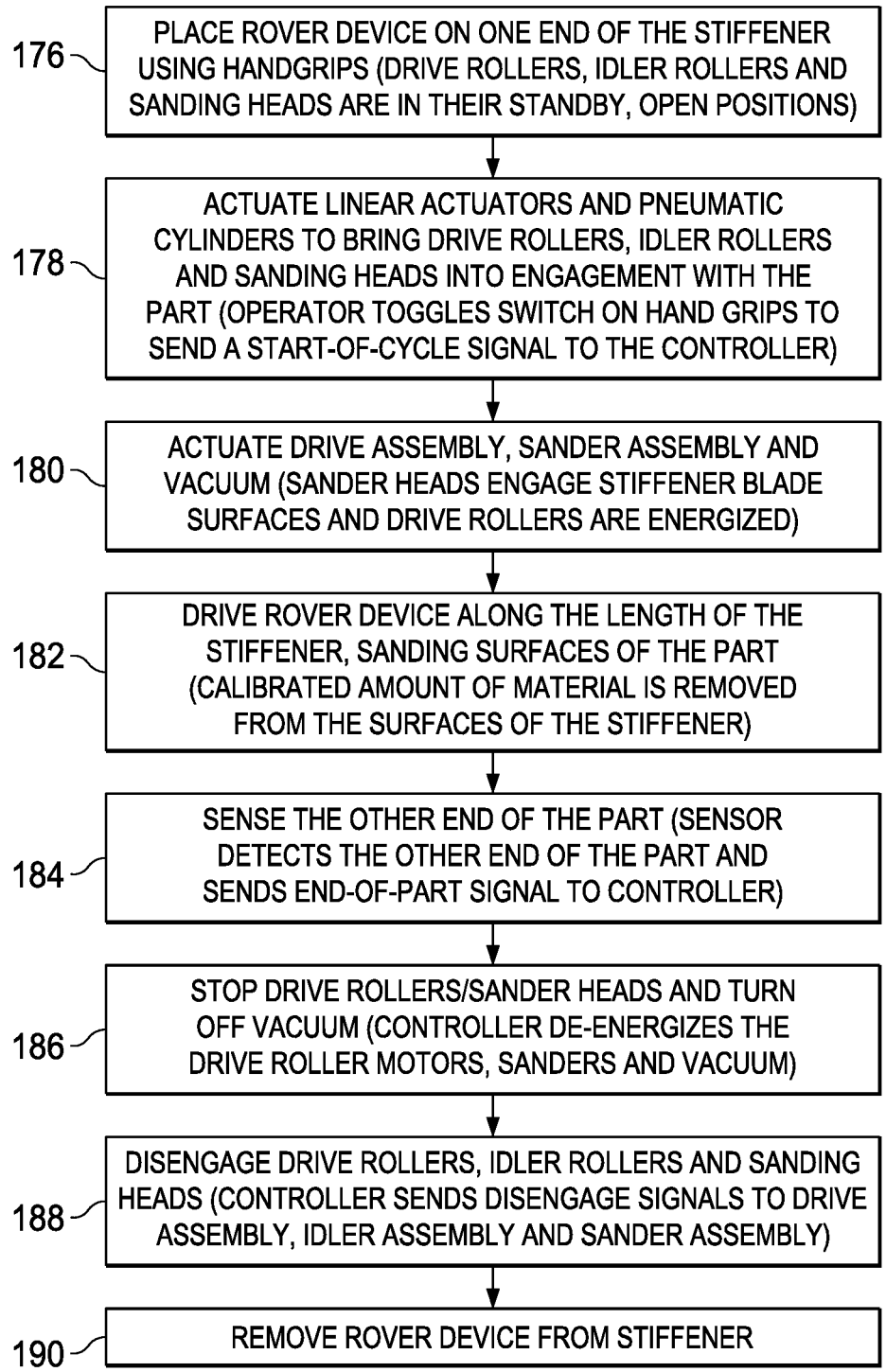
FIG. 25 is an illustration of a flow diagram of a method of sanding opposite sides of a composite stiffener.

Reference is now made to FIG. 25 which broadly illustrates the steps of a method of removing material from a part 32, such as the blade 34 of a stiffener or similar structure. Beginning at 176, an operator picks up the rover device 30 using the handgrips 62 and places it on one end 32*a* of the stiffener 32, bringing the idler rollers 70 into contact with the top 34*c* of the stiffener blade 34. In this starting condition, the drive assembly 38, idler assembly 40 and sander assembly 42 are in their open, standby positions, disengaged from the stiffener blade 34. At 178, the drive assembly 38, idler assembly 40, sander assembly 42 are actuated, bringing them into engagement with the stiffener blade 34. Specifically, the operator actuates the toggle switches 64 on the handgrips 62, causing a start-of-cycle signal 59 to be sent to the controller 52. The controller 52 responds to the start-of-cycle signal 59 by actuating the pneumatically driven linear actuators 86, 102, which pivot the drive rollers 76 and idler rollers 100 into engagement with the stiffener blade 34, clamping the rover device 30 on the stiffener 32.

At 180, the drive assembly 38, sander assembly 42 and vacuum assembly 44 are energized by the controller 22. Specifically, the sanders 110 and the vacuum 46 are energized, following which the pneumatic cylinders 124 are actuated, causing the linear slides 118 to move the sander heads 144 into engagement the surfaces 34*a* of the stiffener blade 34. Simultaneously, the drive motors 74 are energized, causing the drive rollers 76 to begin driving the rover device 30 along the stiffener blade 34. At 182, the rover device 30 is driven along the length of the stiffener, as the sander heads 110 remove a calibrated amount of material from the surfaces 34*a* of the stiffener blade 34. The material removed by the sander heads 110 in the form of sanding dust is collected by the vacuum assembly 44 and drawn away from the rover device 30 to a vacuum/collector 46.

At 184, when the rover device 30 reaches the other end 32*b* of the stiffener 32, the on-board sensor 170 senses the end 34*b* of the blade 34 and sends an end-of-part signal 57 to the controller 52. 186, the controller 52 responds to the end-of-part signal 57 by de-energizing the drive roller motors 74, the sanders 110 and the vacuum 46. Then, at 188, the drive assembly 38 and idler assembly 40 are deactuated. Specifically, the linear actuators 86, 102 and the pneumatic cylinders and 24 deactuated, causing the drive rollers 76, idler rollers 100 and sander heads 144 to disengage from the stiffener blade 34. At 190, the operator may lift the rover device 30 away from the stiffener 32 using the handgrips 62.

Figure 26:
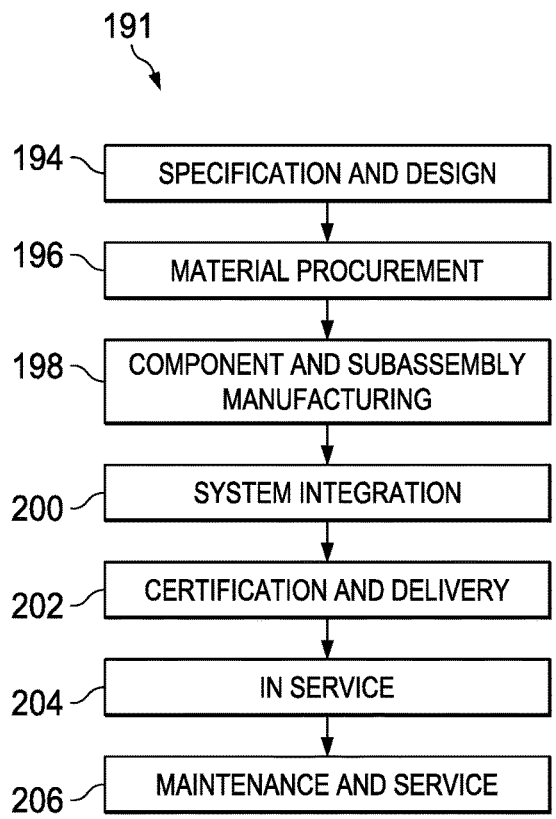
FIG. 26 is an illustration of a flow diagram of aircraft production and service methodology.
Figure 27:
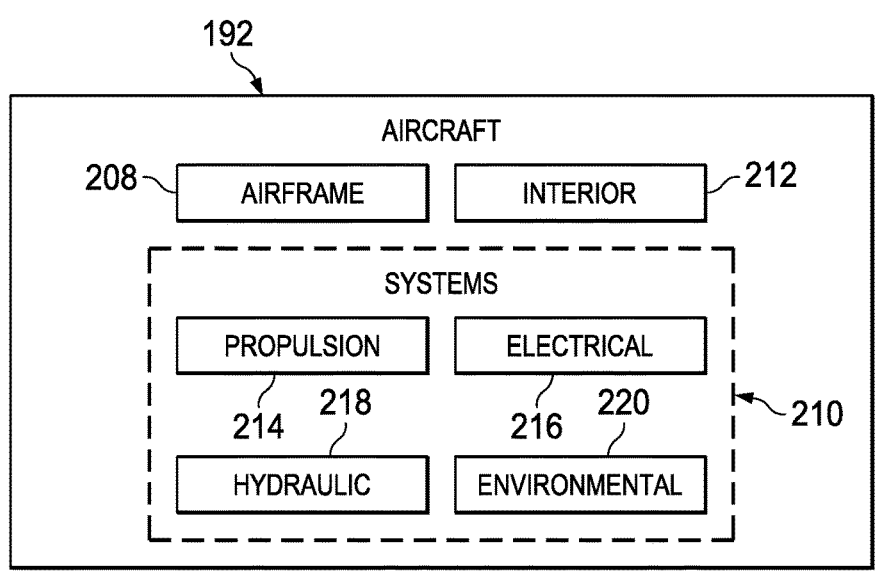
FIG. 27 is an illustration of a block diagram of an aircraft.

Embodiments of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 26 and 27, embodiments of the disclosure may be used in the context of an aircraft manufacturing and service method 191 as shown in FIG. 26 and an aircraft 192 as shown in FIG. 27. Aircraft applications of the disclosed embodiments may include, for example, without limitation, fuel and hydraulic systems that use tubes containing pressurized fluids. During pre-production, exemplary method 191 may include specification and design 194 of the aircraft 192 and material procurement 196. During production, component and sub-assembly manufacturing 198 and system integration 200 of the aircraft 192 takes place. Thereafter, the aircraft 192 may go through certification and delivery 202 in order to be placed in service 204. While in service by a customer, the aircraft 192 is scheduled for routine maintenance and service 206, which may also include modification, reconfiguration, refurbishment, and so on.

Each of the processes of method 191 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 192 produced by exemplary method 191 may include an airframe 208 with a plurality of systems 210 and an interior 212. Examples of high-level systems 210 include one or more of a propulsion system 214, an electrical system 216, a hydraulic system 218 and an environmental system 220. Any number of other systems may be included. Although an aerospace example is shown, the principles of the disclosure may be applied to other industries, such as the marine and automotive industries.

Systems and methods embodied herein may be employed during any one or more of the stages of the production and service method 191. For example, components or subassemblies corresponding to production process 198 may be fabricated or manufactured in a manner similar to components or subassemblies produced while the aircraft 192 is in service. Also, one or more apparatus embodiments, method embodiments, or a combination thereof may be utilized during the production stages 198 and 200, for example, by substantially expediting assembly of or reducing the cost of an aircraft 192. Similarly, one or more of apparatus embodiments, method embodiments, or a combination thereof may be utilized while the aircraft 192 is in service, for example and without limitation, to maintenance and service 206.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device for treating surfaces of an elongate part, comprising:
  a frame;

a drive carried on the frame for driving the device along a length of the elongate part;

a pair of surface treatment tools carried on the frame for respectively treating the surfaces of the elongate part;

a vacuum assembly supported on the frame for carrying away material generated by the pair of surface treatment tools; and, a controller for controlling operation of the drive, the pair of surface treatment tools and the vacuum assembly.

2. The device of claim 1, further comprising:

a sensor coupled with the controller and carried on the frame for sensing an end of the elongate part and producing an end-of-part signal when the end of the elongate part has been sensed, and wherein the controller is responsive to the end-of-part signal for disengaging the drive.

3. The device of claim 1, further comprising:

a pair of handgrips on the frame configured to be gripped by an operator; and, a pair of switches respectively on the pair of handgrips for sending start signals to the controller.

4. The device of claim 1, wherein:

each of the pair of surface treatment tools includes sanders, and the sanders are arranged in opposing relationship and are configured to engage and remove material from opposite sides of the elongate part.

5. The device of claim 4, wherein each of the sanders includes:

a sander head engageable with one of opposite sides of the elongate part, and a sander shroud substantially surrounding the sander head.

6. The device of claim 5, wherein:

each of the sanders includes a set of flexible elements surrounding a first portion of a corresponding one of sander heads, the set of flexible elements configured to engage the elongate part and operative to prevent escape of the material removed by a sander, and the vacuum assembly includes a vacuum shroud adapted to be coupled with a vacuum source and surrounding a second portion of each of the sander heads.

7. The device of claim 1, further comprising:

at least one idler assembly mounted on frame for clamping and centering the device on the elongate part.

8. The device of claim 7, wherein the idler assembly includes:

a pair of pivotally mounted pincher members, a pair of idler rollers respectively mounted on the pair of pivotally mounted pincher members and configured to clamp the elongate part therebetween, and a linear actuator coupled with the pair of pivotally mounted pincher members for pivoting the pair of pivotally mounted pincher members and forcing the pair of idler rollers into clamping engagement with the elongate part.

9. The device of claim 1, further comprising:

a pair of power operated slides each movable toward and away from the surfaces of the elongate part, and wherein the pair of surface treatment tools are respectively mounted on the pair of power operated slides in opposing relationship to each other.

10. The device of claim 9, wherein the pair of power operated slides are pivotally mounted on the frame and are configured to allow the pair of surface treatment tools to be swung between an operative position engaging the part, and a service position allowing servicing of the pair of surface treatment tools.

11. The device of claim 1, wherein the drive includes:

a pair of pivotally mounted pincher members, a pair of drive rollers respectively mounted on the pair of pivotally mounted pincher members and configured to clamp the elongate part therebetween, and a pair of linear actuators for respectively pivoting the pair of pivotally mounted pincher members to force the pair of drive rollers into driving engagement with the elongate part.

12. An automated rover device for sanding opposite sides of an elongate composite stiffener, comprising:

a frame assembly, including a frame;

a drive assembly mounted on the frame assembly for driving the automated rover device along a length of the elongate composite stiffener;

a pair of sanders mounted on the frame assembly for respectively sanding opposite sides of the elongate composite stiffener; and a vacuum assembly carried on the frame assembly and configured to be coupled with a vacuum source for drawing away sanding material from the elongate composite stiffener, including a shroud at least partially surrounding the pair of sanders.

13. The automated rover device of claim 12, wherein:

the frame assembly includes a plurality of rollers engaging the stiffener for supporting the automated rover device on the elongate composite stiffener.

14. The automated rover device of claim 13, wherein the rollers are adjustably mounted on the frame to allow adjustment of a pitch of the automated rover device relative to the elongate composite stiffener.

15. The automated rover device of claim 12, wherein the drive assembly includes:

a pair of drive rollers engageable with the opposite sides of the elongate composite stiffener, and a pair of motors powering the pair of drive rollers to clamp the elongate composite stiffener therebetween and drive the automated rover device along the length of the elongate composite stiffener.

16. A method of sanding opposite sides of a composite stiffener, comprising:

placing a rover device on the composite stiffener;

driving the rover device for movement along a length of the composite stiffener using a drive assembly on-board the rover device;

sanding the opposite sides of the composite stiffener using a pair of sanders on-board the rover device, wherein sanding produces material dust;

removing the material dust using a vacuum assembly on-board the rover device;

sensing an end of the composite stiffener using a sensor on-board the rover device; and disengaging the drive assembly when the sensor has sensed the end of the composite stiffener.

17. The method of claim 16, further comprising:

clamping the rover device on the composite stiffener using the drive assembly.

18. The method of claim 16, further comprising:

clamping and centering the rover device on the composite stiffener using two pairs of rollers on-board the rover device.

19. The method of claim 16, further comprising:

sending a start signal to a controller by actuating at least one switch on-board the rover device; and energizing the drive assembly using the controller.

20. The method of claim 16, further comprising:
wherein the vacuum assembly is carried on a frame assembly and configured to be coupled with a vacuum source for drawing away sanding material from the composite stiffener, including a shroud at least partially surrounding the pair of sanders.

* * * * *